US008819289B2

(12) United States Patent
Onda

(10) Patent No.: US 8,819,289 B2
(45) Date of Patent: Aug. 26, 2014

(54) SATELLITE ORBIT DATA COMPRESSING METHOD, SATELLITE ORBIT DATA PROVIDING METHOD, SATELLITE ORBIT DATA DECOMPRESSING METHOD, AND DATA COMPRESSING DEVICE

(75) Inventor: Kenji Onda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 173 days.

(21) Appl. No.: 12/631,969

(22) Filed: Dec. 7, 2009

(65) Prior Publication Data

US 2010/0164800 A1 Jul. 1, 2010

(30) Foreign Application Priority Data

Dec. 29, 2008 (JP) ................. 2008-335750

(51) Int. Cl.
| | | |
|---|---|---|
| *G06F 15/16* | (2006.01) | |
| *G01S 19/05* | (2010.01) | |
| *G01S 19/27* | (2010.01) | |
| *G01S 19/25* | (2010.01) | |

(52) U.S. Cl.
CPC ............ *G01S 19/05* (2013.01); *G01S 19/27* (2013.01); *G01S 19/258* (2013.01)
USPC ............. 709/247; 709/237; 709/250

(58) Field of Classification Search
None
See application file for complete search history.

(56) References Cited

U.S. PATENT DOCUMENTS

| | | | | |
|---|---|---|---|---|
| 4,918,609 | A * | 4/1990 | Yamawaki | 701/478 |
| 7,720,601 | B2 * | 5/2010 | Zhao et al. | 701/478 |
| 7,907,784 | B2 * | 3/2011 | Gladkova et al. | 382/232 |
| 7,920,590 | B2 * | 4/2011 | Le et al. | 370/467 |
| 2002/0188403 | A1 | 12/2002 | LaMance et al. | |
| 2004/0008650 | A1 * | 1/2004 | Le et al. | 370/338 |
| 2005/0212700 | A1 | 9/2005 | Diggelen et al. | |
| 2007/0299609 | A1 | 12/2007 | Garin et al. | |
| 2010/0164800 | A1 * | 7/2010 | Onda | 342/357.15 |

FOREIGN PATENT DOCUMENTS

| | | |
|---|---|---|
| JP | 07-121391 A | 5/1995 |
| JP | 2000-333019 A | 11/2000 |
| JP | 2008-003092 A | 1/2008 |

OTHER PUBLICATIONS

3GPP TSG-GERAN Meeting #34; SiRF Technology, Global Locate, Nokia-Siemens, Motorola, Nokia, Alcatel-Lucent, RIM, AT&T; A-GNSS, Orbit extension; ttp://www.3gpp.org/ftp/tsg_geran/TSG_GERAN/GERAN_34_Shenzhen/Docs/; May 2007.

* cited by examiner

*Primary Examiner* — Viet Vu
*Assistant Examiner* — Keyvan Emdadi
(74) *Attorney, Agent, or Firm* — Global IP Counselors, LLP

(57) ABSTRACT

A satellite orbit data compressing method includes: determining a compression method of a parameter value on the basis of a variation tendency of the parameter value in an orbit model approximating a satellite orbit; and calculating a compressed parameter value by reducing a bit sequence representing the parameter value using the determined compression method.

6 Claims, 25 Drawing Sheets

☆PREDICTED SATELLITE CALENDAR P1

☆PREDICTED SATELLITE CALENDAR P2

343

3431  3433

| TEMPORAL VARIATION PATTERN | COMPRESSION METHOD |
|---|---|
| PATTERN A (LINEAR VARIATION) | COMPRESSION METHOD FOR LINEAR VARIATION |
| PATTERN B (QUADRATIC-CURVE VARIATION) | COMPRESSION METHOD FOR QUADRATIC-CURVE VARIATION |
| PATTERN C (PERIODIC VARIATION) | COMPRESSION METHOD FOR PERIODIC VARIATION |
| PATTERN D (SAW-TOOTH VARIATION) | COMPRESSION METHOD FOR SAW-TOOTH VARIATION |
| PATTERN E (STEP-LIKE VARIATION) | COMPRESSION METHOD FOR STEP-LIKE VARIATION |
| ⋮ | ⋮ |

| PARAMETER \ SATELLITE | SV1 | SV2 | ... | SV32 |
|---|---|---|---|---|
| LONG ORBIT RADIUS | PATTERN C | PATTERN B | ... | PATTERN C |
| ECCENTRICITY | PATTERN A | PATTERN B | ... | PATTERN B |
| ORBIT INCLINATION ANGLE | PATTERN B | PATTERN C | ... | PATTERN B |
| MEAN ANOMALY | PATTERN D | PATTERN C | ... | PATTERN D |
| RIGHT ASCENSION OF ASCENDING NODE | PATTERN E | PATTERN E | ... | PATTERN F |
| ... | ... | ... | ... | ... |
| REFERENCE TIME OF SATELLITE CLOCK | PATTERN B | PATTERN B | ... | PATTERN A |
| OFFSET OF SATELLITE CLOCK | PATTERN A | PATTERN B | ... | PATTERN A |
| DRIFT OF SATELLITE CLOCK | PATTERN C | PATTERN D | ... | PATTERN C |
| DRIFT OF SATELLITE CLOCK FREQUENCY | PATTERN D | PATTERN D | ... | PATTERN C |
| PREDICTED ORBIT RELIABILITY | PATTERN J | PATTERN J | ... | PATTERN J |
| HEALTH INFORMATION | PATTERN K | PATTERN K | ... | PATTERN K |

SATELLITE ORBIT PARAMETER: LONG ORBIT RADIUS ... RIGHT ASCENSION OF ASCENDING NODE

CLOCK CORRECTING PARAMETER: REFERENCE TIME OF SATELLITE CLOCK ... DRIFT OF SATELLITE CLOCK FREQUENCY

RELIABILITY PARAMETER: PREDICTED ORBIT RELIABILITY, HEALTH INFORMATION

FIG.21

| | PARAMETER | PREDICTION PERIOD | 2008 8/8 0:00~6:00 (FIRST PERIOD) | 2008 8/8 6:00~12:00 (SECOND PERIOD) | ... | 2008 8/14 18:00~24:00 (TWENTY-EIGHTH PERIOD) |
|---|---|---|---|---|---|---|
| SATELLITE ORBIT PARAMETER | LONG ORBIT RADIUS | | $a1$ | $\Delta a2$ | ... | $\Delta a28$ |
| | ECCENTRICITY | | $e1$ | $\Delta e2$ | ... | $\Delta e28$ |
| | ORBIT INCLINATION ANGLE | | $i_01$ | $\Delta i_02$ | ... | $\Delta i_028$ |
| | MEAN ANOMALY | | $M_01$ | $\Delta M_02$ | ... | $\Delta M_028$ |
| | RIGHT ASCENSION OF ASCENDING NODE | | $\Omega_01$ | $\Delta \Omega_02$ | ... | $\Delta \Omega_028$ |
| | ... | | ... | ... | ... | ... |
| CLOCK CORRECTING PARAMETER | REFERENCE TIME OF SATELLITE CLOCK | | $t_c1$ | $\Delta t_c2$ | ... | $\Delta t_c28$ |
| | OFFSET OF SATELLITE CLOCK | | $a_01$ | $\Delta a_02$ | ... | $\Delta a_028$ |
| | DRIFT OF SATELLITE CLOCK | | $a_11$ | $\Delta a_12$ | ... | $\Delta a_128$ |
| | DRIFT OF SATELLITE CLOCK FREQUENCY | | $a_21$ | $\Delta a_22$ | ... | $\Delta a_228$ |
| RELIABILITY PARAMETER | PREDICTED ORBIT RELIABILITY | | $u1$ | $\Delta u2$ | ... | $\Delta u28$ |
| | HEALTH INFORMATION | | $h1$ | $\Delta h2$ | ... | $\Delta h28$ |

3547-1, 3547-2, 3547-3 ... 3547

SATELLITE ORBIT DATA COMPRESSING METHOD, SATELLITE ORBIT DATA PROVIDING METHOD, SATELLITE ORBIT DATA DECOMPRESSING METHOD, AND DATA COMPRESSING DEVICE

The entire disclosure of Japanese Patent Application No. 2008-335750, filed Dec. 29, 2008, is expressly incorporated by reference herein.

BACKGROUND

1. Technical Field

The present invention relates to a satellite orbit data compressing method, a satellite orbit data providing method, a satellite orbit data decompressing method, and a data compressing device.

2. Related Art

A global positioning system (GPS) is widely known as a position calculating system employing positioning signals and is used in position calculating devices built into mobile phones and car navigation apparatuses. In the GPS, a position calculating operation for calculating a three-dimensional coordinate value indicating the position of a target apparatus and a clock error is carried out on the basis of information such as positions of plural GPS satellites or the quasi-distance from the GPS satellites to the target apparatus.

In calculating a position using the GPS, satellite information such as the position, velocity, and moving direction of the GPS satellite is first calculated on the basis of navigation data such as almanac or ephemeris which overlaps with a GPS satellite signal emitted from the GPS satellite. The almanac serves as an influential key to capture a satellite but is not generally used in the position calculating operation, because it is poor in accuracy concerning the satellite orbit. On the other hand, the ephemeris serves as an influential key to capture a satellite and can also be used in the position calculating operation, because it is excellent in accuracy concerning the satellite orbit. Therefore, for example, when the position calculating operation is started without the ephemeris, the ephemeris should be acquired from the GPS satellite signal, thereby enhancing the TTFF (Time To First Fix).

Therefore, in a server and client system, a technique for allowing a server to predict long-term predicted ephemeris (long-term predicted orbit data), which is a kind of satellite orbit data and is the ephemeris corresponding to a long term of one week, and to provide the long-term predicted ephemeris to a position calculating device as a client was developed and disclosed, for example, in US-A-2002-188403 and US-A-2005-212700.

Since the long-term predicted ephemeris is data acquired by predicting satellite orbits of all the GPS satellites for a long term (for example, one week), the size thereof is much greater than that of the ephemeris for one satellite. Since the long-term predicted ephemeris is downloaded from a server system and used by a position calculating device, there is a need for reducing the size of the long-term predicted ephemeris so as to be as small as possible, thereby reducing communication cost of communication time and communication traffic.

SUMMARY

An advantage of some aspects of the present invention is to provide a technique for reducing the size of satellite orbit data provided to a position calculating device.

According to an aspect of the invention, a satellite orbit data compressing method includes: determining a compression method of a parameter value on the basis of a variation tendency of the parameter value in an orbit model approximating a satellite orbit; and calculating a compressed parameter value by reducing a bit sequence representing the parameter value using the determined compression method.

According to another aspect of the invention, a data compressing device includes: a determination unit determining a compression method of a parameter value on the basis of a variation tendency of the parameter value in an orbit model approximating a satellite orbit; and a calculation unit calculating a compressed parameter value by reducing a bit sequence representing the parameter value using the determined compression method.

According to the above-mentioned aspects, the compression method of the parameter value is determined on the basis of the variation tendency of the parameter value in the orbit model approximating a satellite orbit. The compressed parameter value is calculated by reducing the bit sequence representing the parameter value using the determined compression method, whereby the satellite orbit data is compressed.

That enables to effectively reduce the size of the satellite orbit data by selecting a proper compression method of the parameter value to calculate the compressed parameter value on the basis of the variation tendency of the parameter value in the orbit model.

In the satellite orbit data compressing method, a plurality of variation patterns of the parameter value and compression methods suitable for the variation patterns may be predetermined, and the determining of the compression method may include determining the compression method by selecting the variation pattern suitable for the variation tendency from the plurality of variation patterns and selecting the compression method corresponding to the selected variation pattern.

According to this configuration, the plural variation patterns of the parameter value and the compression methods suitable for the variation patterns are predetermined. The parameter value is compressed by selecting the compression method corresponding to the variation pattern suitable for the variation tendency of the parameter value. Accordingly, that enables to effectively reduce the bit sequences using the compression method suitable for the respective parameters.

In the satellite orbit data compressing method, the determining of the compression method may include employing a compression method that is predetermined to be suitable for a particular parameter among a plurality of parameters included in the orbit model.

According to this configuration, the compression method that is determined in advance as a compression method suitable for the particular parameter out of a plurality of parameters included in the orbit model is determined for the particular parameter. Some parameters included in the orbit model have an almost constant variation tendency. The compression methods are determined in advance for such parameters and the compressed parameter values are suitably calculated using the determined compression methods.

In the satellite orbit data compressing method, the compression method may be a predetermined lossless compression method.

According to this configuration, since the satellite orbit data is compressed using a lossless compression method, the party decompressing the satellite orbit data can reconstruct the parameter values of the orbit model expression without error.

According to another aspect of the invention, there is provided a satellite orbit data providing method including: providing satellite orbit data including the compressed parameter value, which is calculated by performing the above-mentioned satellite orbit data compressing method, to a position calculating device along with identification information of the compression method.

According to this aspect, since the compressed satellite orbit data is provided along with the identification information of the parameter value compressing method, the position calculating device can know what compression method is used to compress the parameter values.

According to another aspect of the invention, a satellite orbit data decompressing method includes: selecting a compression method on the basis of the identification information provided in the satellite orbit data providing method; and acquiring the parameter values of the orbit model by decompressing the compressed parameter values included in the satellite orbit data provided in the satellite orbit data providing method using the selected compression method.

According to this aspect, that enables to decompress the compressed parameter values included in the provided satellite orbit data to the original parameter values using the compression methods used to calculate the compressed parameter values. Therefore, that enables to reconstruct the parameter values of the orbit model expression without error.

BRIEF DESCRIPTION OF THE DRAWINGS

The invention will be described with reference to the accompanying drawings, wherein like numbers reference like elements.

FIG. 17 is a diagram illustrating the configuration of compression method data.

FIG. 20 is a diagram illustrating an example of a data configuration of a temporal variation pattern.

FIG. 21 is a diagram illustrating an example of a data configuration of a compressed predicted ephemeris.

DESCRIPTION OF EXEMPLARY EMBODIMENTS

Hereinafter, exemplary embodiments of the invention will be described with reference to the accompanying drawings. However, the invention is not limited to the exemplary embodiments.

1. System Configuration

Figure 1:
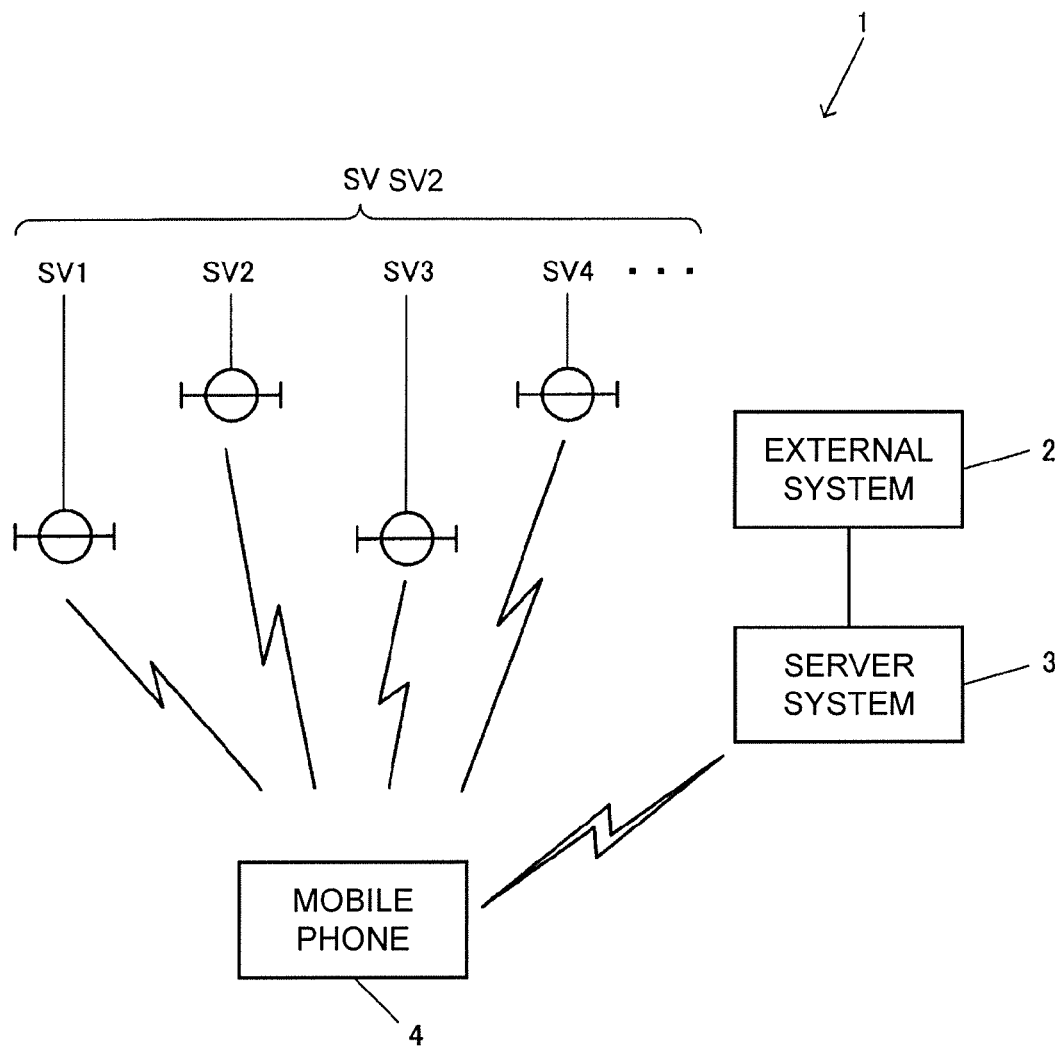
FIG. 1 is a diagram schematically illustrating the configuration of a position calculating system.

FIG. 1 is a diagram schematically illustrating the configuration of a position calculating system 1 according to an exemplary embodiment. The position calculating system 1 includes an external system 2, a server system 3 which is a kind of data compressing device, a mobile phone 4 which is a kind of electronic apparatus having a position calculating device, and plural GPS satellites SV (SV1, SV2, SV3, SV4, . . . ) which are a kind of positioning satellites. The position calculating operation can be carried out using the mobile phone 4 and the GPS satellites SV, after the mobile phone 4 acquires necessary data from the server system 3. Accordingly, the mobile phone 4 and the GPS satellites SV constitute one position calculating system. The server system 3 and the mobile phone 4 can be called a position calculating system as an earth-side system.

The external system 2 is a known system for periodically receiving satellite signals from the GPS satellites SV, creating a predicted satellite calendar on the basis of navigation data included in the received satellite signals, and providing the created predicted satellite calendar to the server system 3. The predicted satellite calendar provided from the external system 2 is position data in which the predicted positions acquired by predicting the future positions of the GPS satellites SV and predicted clock errors acquired by predicting errors of atomic clocks built into the GPS satellites SV are arranged at a predetermined time interval (for example, an interval of 15 minutes) in time series. For example, the external system 2 is a private or public computer system making a business of providing predicted satellite calendars.

The server system 3 is a system having a server acquiring the predicted satellite calendars from the external system 2 and creating and providing an ephemeris (hereinafter, referred to as "long-term predicted ephemeris" in this embodiment or "long-term predicted orbit data" because it is an orbit valid for a long term), valid for a long term of at least one day, for example, one week, as the predicted ephemeris, which is a kind of satellite orbit data, for all the GPS satellites SV using the acquired predicted satellite calendars. The ephemeris transmitted from the GPS satellites SV is valid for 4 hours. Accordingly, the term of validity of the long-term predicted ephemeris provided from the server system 3 is longer.

The mobile phone 4 is an electronic apparatus used by a user to communicate or to transmit and receive mails and has a position calculating device performing a position calculating function in addition to the inherent functions of the mobile phone of communicating or transmitting and receiving mails. The mobile phone 4 transmits a request signal for the long-term predicted ephemeris to the server system 3 by the user's operation and acquires the long-term predicted ephemeris from the server system 3. The mobile phone captures the GPS satellites SV using the acquired long-term predicted ephemeris and carries out the position calculating operation based on the GPS satellite signals.

2. Principle

The server system 3 performs a process of creating the long-term predicted ephemeris using the predicted satellite calendars acquired from the external system 2. Specifically, the period from the creation time of the long-term predicted ephemeris to the time after one week is used as a creation period and the creation period is divided into plural periods (hereinafter, referred to as "prediction periods") when a satellite orbit is approximated and modeled. In this embodiment, the lengths of the prediction periods are set constant, whereby plural kinds of long-term predicted ephemeris of which the prediction periods are set to 4 hours, 6 hours, and 8 hours are created.

The server system 3 extracts the predicted position in each prediction period out of the predicted positions included in the predicted satellite calendar acquired from the external system 2. Kepler's satellite orbit model expression (hereinafter, also referred to as "approximate model"), in which the square sum of distances from all the extracted predicted positions in the prediction period is the least, is calculated on the respective prediction periods. The parameters of the calculated approximate model expression of the satellite orbit are referred to as "satellite orbit parameters" and the calculation for the approximate model is also referred to as "approximating calculation". The predicted satellite orbit acquired by the approximating calculation is referred to as "predicted orbit".

The server system 3 extracts a predicted clock error of each prediction period in the predicted satellite calendars acquired from the external system 2. A clock error model expression approximating a temporal variation of the clock error is calculated on the respective prediction periods using the predicted clock error of each prediction period. Parameters of the calculated clock error model expression are called "clock correcting parameters".

In each prediction period, the server system 3 determines "predicted orbit reliability" which is an indicator value indicating the reliability of the predicted orbit for each prediction period and "health information" indicating soundness of each GPS satellite SV in the prediction period. The predicted orbit reliability is expressed by 16 steps of "0" to "15", where "0" represents the highest reliability of the predicted orbit and "15" represents the lowest reliability of the predicted orbit.

The health information is expressed by, for example, binary values of "0" and "1", where "0" represents that the GPS satellite SV is sound and "1" represents that the GPS satellite SV is not sound. The predicted orbit reliability is a value corresponding to the "URA index" included in the ephemeris and the health information is a value corresponding to the "SV health" included in the ephemeris. In this embodiment, the predicted orbit reliability and the health information are called "reliability parameters". The specific method of determining the reliability parameters employs known methods and thus description thereof is omitted.

The long-term predicted ephemeris is data including the values of the satellite orbit parameters, the clock correcting parameters, and the reliability parameters in all the prediction periods for all the GPS satellites and thus has a great amount of data. The long-term predicted ephemeris is downloaded and used from the server system 3 by the mobile phone 4. Accordingly, it is required that the amount of data of the long-term predicted ephemeris should be as small as possible. Therefore, in this embodiment, the amount of data of the long-term predicted ephemeris is reduced by creating compressed long-term predicted ephemeris including compressed parameter values (hereinafter, referred to as "compressed parameter values") instead of the values of the above-mentioned parameters.

Figure 2:
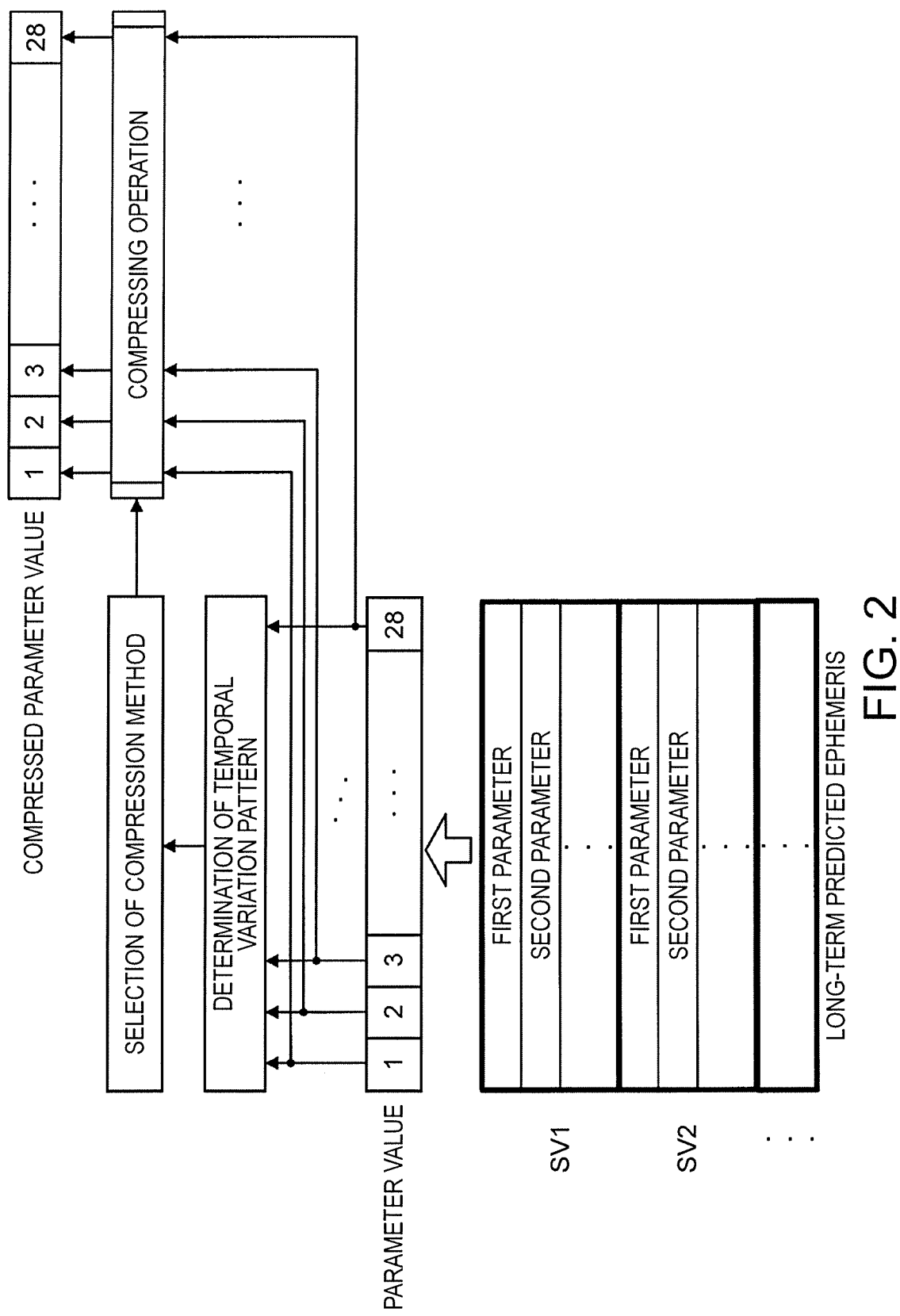
FIG. 2 is a diagram illustrating the principle of creating a compressed long-term predicted ephemeris.

FIG. 2 is a diagram illustrating the principle of creating the compressed long-term predicted ephemeris according to this embodiment. In FIG. 2, the numbers added to the parameter values and the compressed parameter values represent the numbers of the prediction periods. Here, it is assumed that the prediction period is 6 hours. In this case, by dividing the period of one week as a creation period by 6 hours, 28 prediction periods (first prediction period to twenty-eighth prediction period) are formed.

In this embodiment, the server system 3 determines a temporal variation pattern of each parameter value for each GPS satellite. Specifically, time-series data of a parameter value in the first to twenty-eighth prediction periods is created for each parameter. Then, the server system 3 determines which data of predetermined plural temporal variation patterns the created time-series data is suitable for. The determination of the temporal variation pattern can be carried out by performing a pattern matching process on the created time-series data and the pattern-matching time-series data previously prepared for each temporal variation pattern.

The temporal variation patterns are correlated with compression methods. That is, compression methods for most effectively reducing the bit sequence representing the parameter value are determined in advance depending on the temporal variation patterns.

Specifically, the compressed parameter values are expressed by difference values calculated from the parameter values in the first to twenty-eighth prediction periods. However, it depends on the compression methods which prediction period the difference value should be calculated in or what the degree of difference should be set to (what degree of difference should be calculated). For example, a sequence of "1, 3, 5, 7, 9, . . . " has a first degree of difference of "2". A sequence of "1, 2, 4, 7, 11, . . . " has a second degree of difference of "1". That enables to effectively compress the parameter values by employing a compression method having a high compression effect (bit sequence reducing effect) depending on what variation pattern the parameter value has.

More specifically, for example, a method of calculating the compressed parameter value in the corresponding prediction period by calculating first differences between the parameter value in the first prediction period and the parameter values in the second to twenty-eighth prediction periods is determined as compression method a for temporal variation pattern A. For example, a method of calculating the compressed parameter values in the corresponding prediction period by calculating second differences between the parameter values in the adjacent prediction periods is determined as compression method b for temporal variation pattern B.

In this embodiment, a lossless compression method is used as the compression method. Accordingly, that enables to reconstruct the original parameter values from the compressed parameter values without error.

The above-mentioned determination of the temporal variation pattern is carried out on all the parameters of the all the GPS satellites SV. The compressed parameter values of the parameters are calculated by selecting the compression methods correlated with the determined temporal variation patterns and performing a compression operation. The compressed long-term predicted ephemeris is data including the compressed parameter values of all the parameters for all the GPS satellites SV.

In fact, a test of inspecting the temporal variation patterns of the parameters by predicting and calculating the long-term predicted ephemeris was carried out. The test result will be described now.

Figure 3:
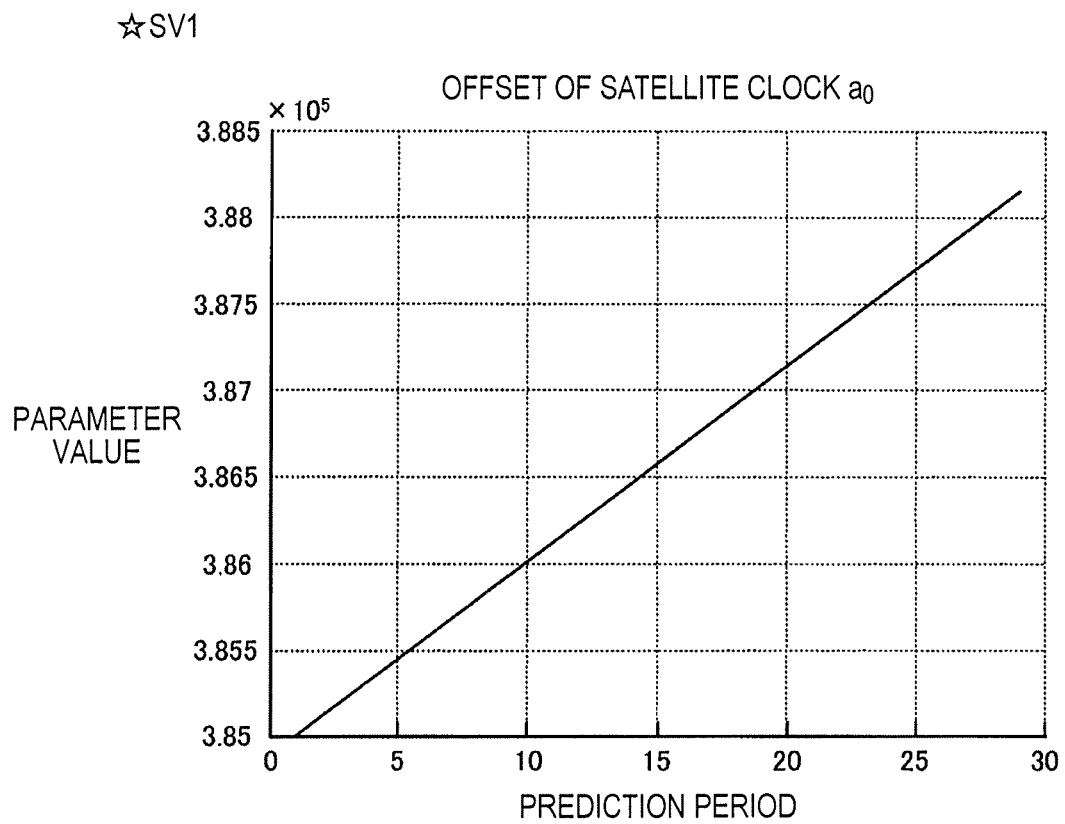
FIG. 3 is a graph illustrating an example of a temporal variation of a parameter value.

FIG. 3 is a graph illustrating an example of the temporal variation of a satellite clock offset "$a_0$" which is a clock correcting parameter for a GPS satellite SV1. Here, the horizontal axis represents the prediction periods (first to twenty-eighth prediction periods) of the long-term predicted ephemeris and the vertical axis represents the parameter value of the corresponding parameter. The prediction period length is set to 6 hours. This is true in FIGS. 4 to 7. As a result, the temporal variation of the satellite clock offset of the GPS satellite SV1 has a shape which can be approximated by a linear function and is thus suitable for a linear temporal variation pattern. Accordingly, the compressed parameter value of the satellite clock offset is calculated using the compression method predetermined for a linear variation.

Figure 4:
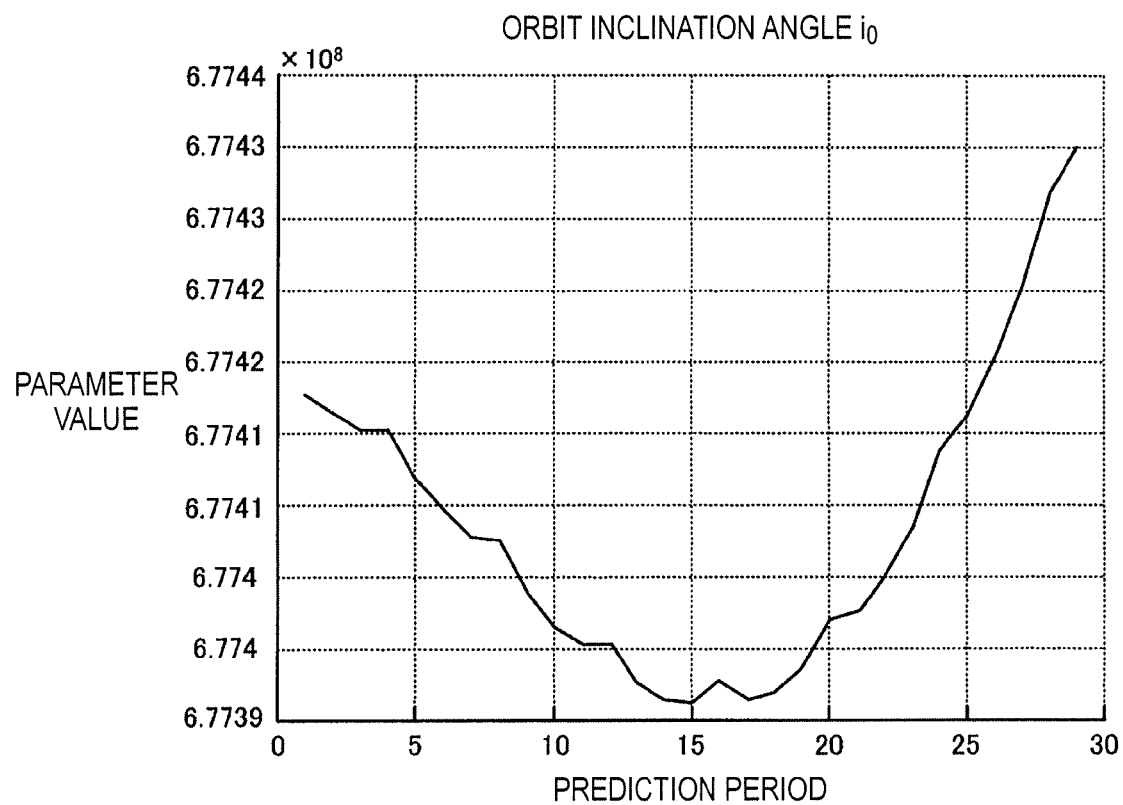
FIG. 4 is a graph illustrating an example of a temporal variation of a parameter value.

FIG. 4 is a graph illustrating an example of the temporal variation of an orbit inclination angle "$i_0$" which is a satellite orbit parameter for the GPS satellite SV1. As a result, the temporal variation of the orbit inclination angle of the GPS satellite SV1 has a shape which can be approximated by a quadratic function and is thus suitable for a quadratic-curve temporal variation pattern. Accordingly, the compressed parameter value of the orbit inclination angle is calculated using the compression method predetermined for a quadratic-curve variation.

Figure 5:
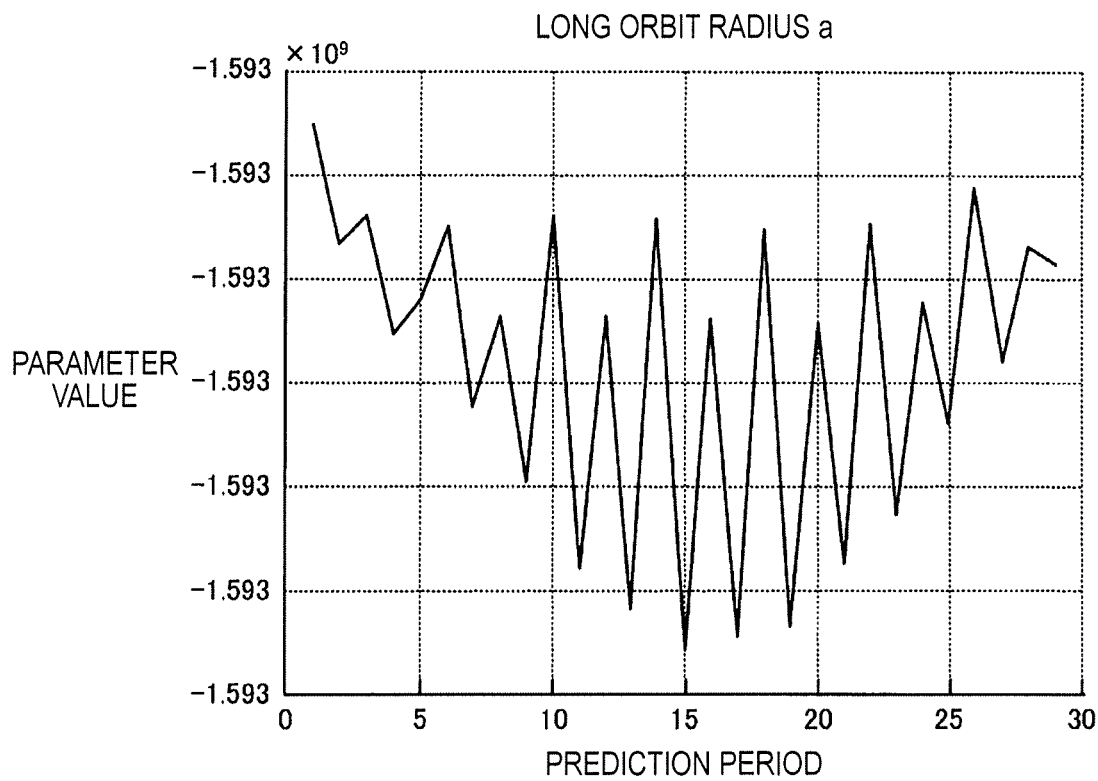
FIG. 5 is a graph illustrating an example of a temporal variation of a parameter value.

FIG. 5 is a graph illustrating an example of the temporal variation of a long orbit radius "a" which is a satellite orbit parameter for the GPS satellite SV1. As a result, the temporal variation of the long orbit radius of the GPS satellite SV1 has a shape obtained by combining plural sinusoidal waves and is thus suitable for a periodic temporal variation pattern. Accordingly, the compressed parameter value of the long orbit radius is calculated using the compression method predetermined for a periodic variation. Since the vertical axis has a significant cipher of four, the vertical axis value is shown as the same value, but actually it varies.

Figure 6:
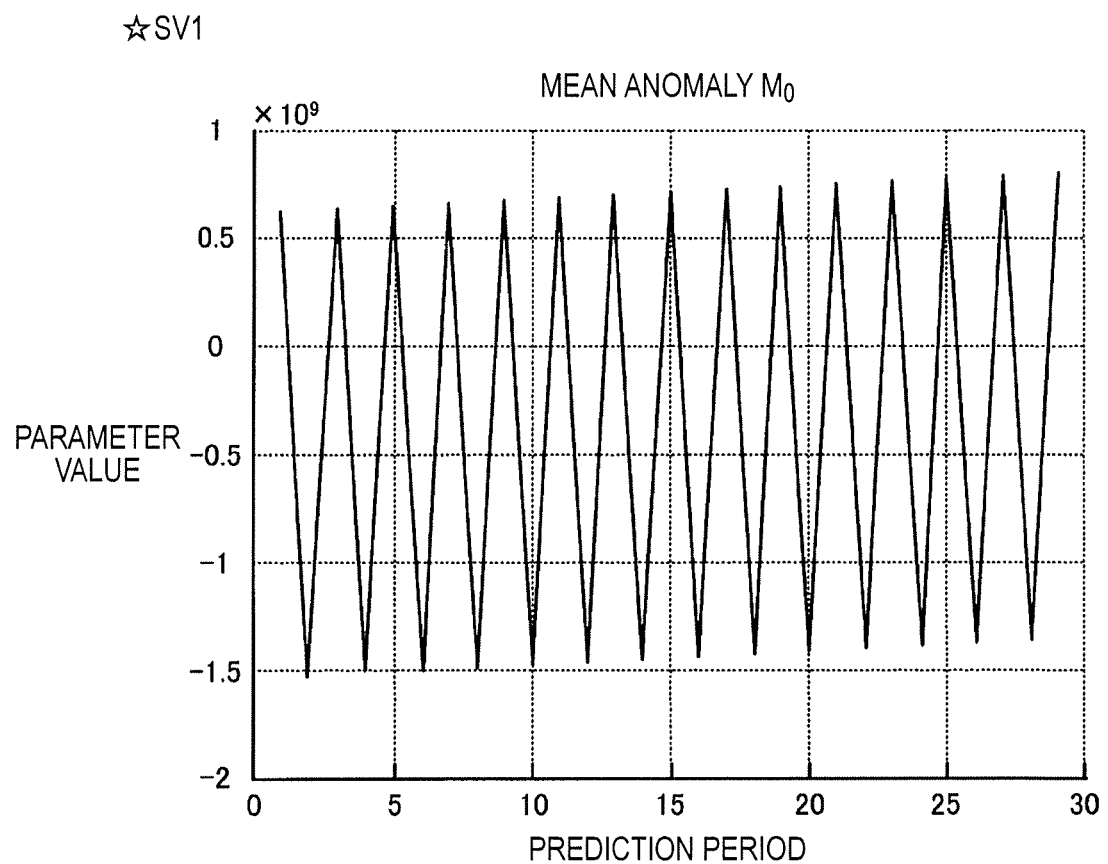
FIG. 6 is a graph illustrating an example of a temporal variation of a parameter value.

FIG. 6 is a graph illustrating an example of the temporal variation of a mean anomaly "$M_0$" which is a satellite orbit parameter for the GPS satellite SV1. As a result, the temporal variation of the mean anomaly of the GPS satellite SV1 has a saw-tooth shape and is thus suitable for a saw-tooth temporal variation pattern. Accordingly, the compressed parameter value of the mean anomaly is calculated using the compression method predetermined for a saw-tooth variation.

Figure 7:
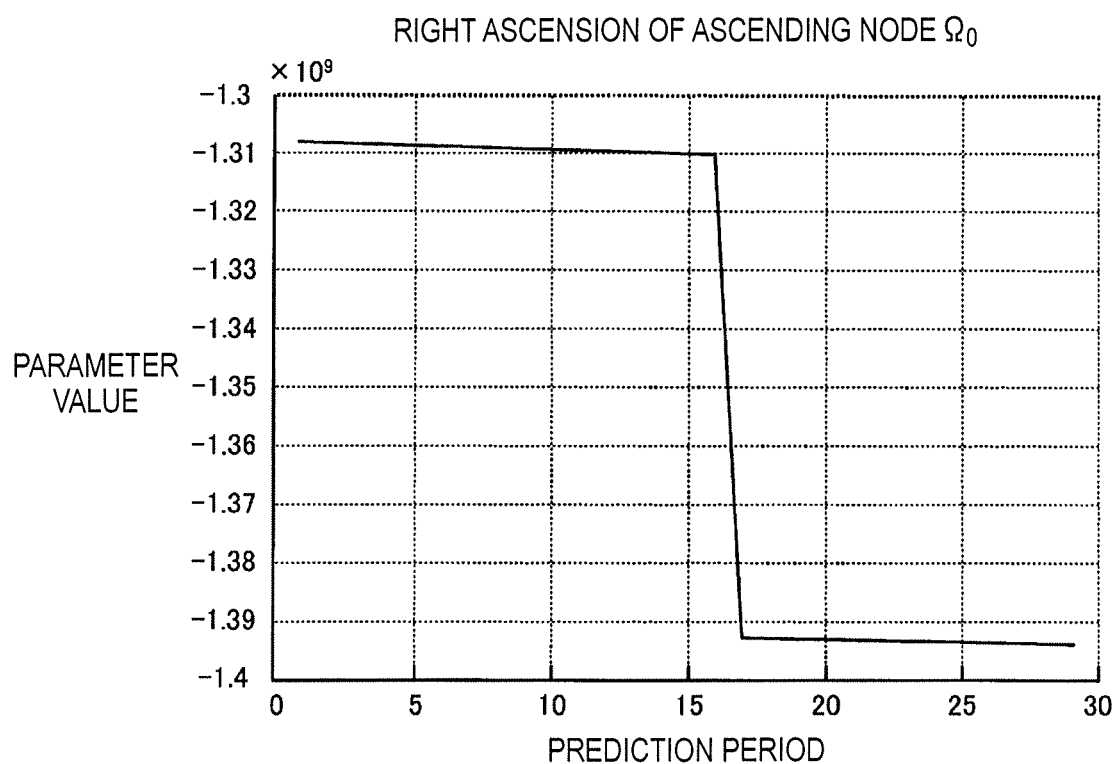
FIG. 7 is a graph illustrating an example of a temporal variation of a parameter value.

FIG. 7 is a graph illustrating an example of the temporal variation of a right ascension of an ascending node "$\Omega_0$" which is a satellite orbit parameter for the GPS satellite SV1. As a result, the temporal variation of the right ascension of an ascending node of the GPS satellite SV1 has a step-like shape and is thus suitable for a step-like temporal variation pattern. Accordingly, the compressed parameter value of the right ascension of an ascending node is calculated using the compression method predetermined for a step-like variation.

The inventors carried out a lot of tests and found out as a result that the temporal variation pattern of the parameter value of a parameter varies depending on a difference in predicted satellite calendar used to calculate the parameter, a difference in length of the prediction period, or an individual difference of the GPS satellites SV. Therefore, the server system 3 performs the determination of a temporal variation pattern and the compression operation on the parameter values for each GPS satellite, when creating the long-term predicted ephemeris using different predicted satellite calendars or when creating the long-term predicted ephemeris in different prediction periods.

Figure 8:
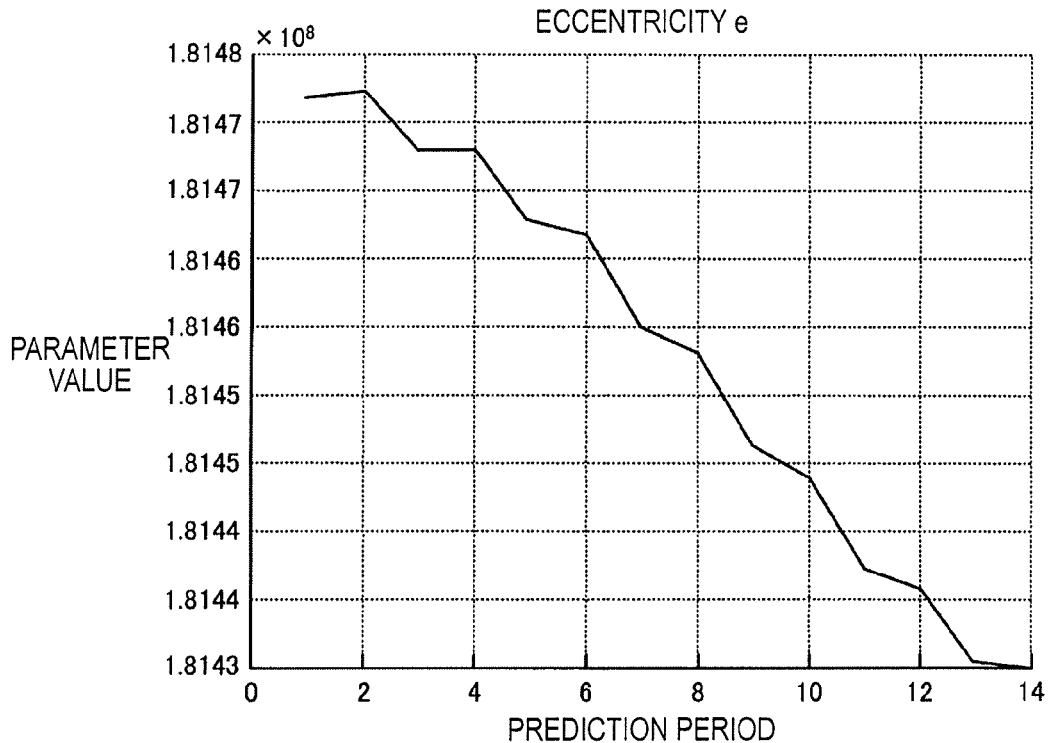
FIG. 8 is a graph illustrating an example of a temporal variation of a parameter value.
Figure 9:
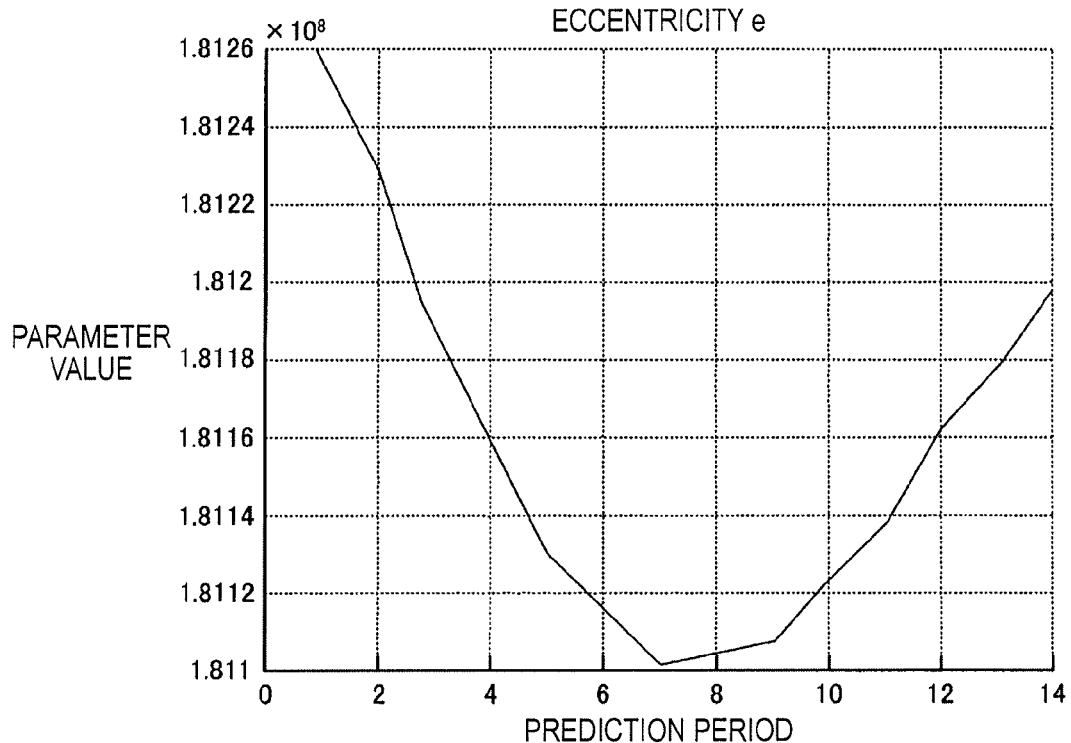
FIG. 9 is a graph illustrating an example of a temporal variation of a parameter value.

FIGS. 8 and 9 are graphs illustrating examples of the temporal variation when the value of eccentricity "e" which is a satellite orbit parameter for the GPS satellite SV1 is calculated using different predicted satellite calendars. FIG. 8 shows the calculation result using predicted satellite calendar P1 and FIG. 9 shows the calculation result using predicted satellite calendar P2. The lengths of the prediction periods are both set to 12 hours. As a result, when the eccentricity is calculated using predicted satellite calendar P1, it is suitable for a substantially linear temporal variation pattern. On the contrary, when the eccentricity is calculated using predicted satellite calendar P2, it is suitable for a quadratic-curve temporal variation pattern. Accordingly, it can be seen that it is necessary to compress the same parameter using different compression methods depending on the predicted satellite calendars used.

Figure 10:
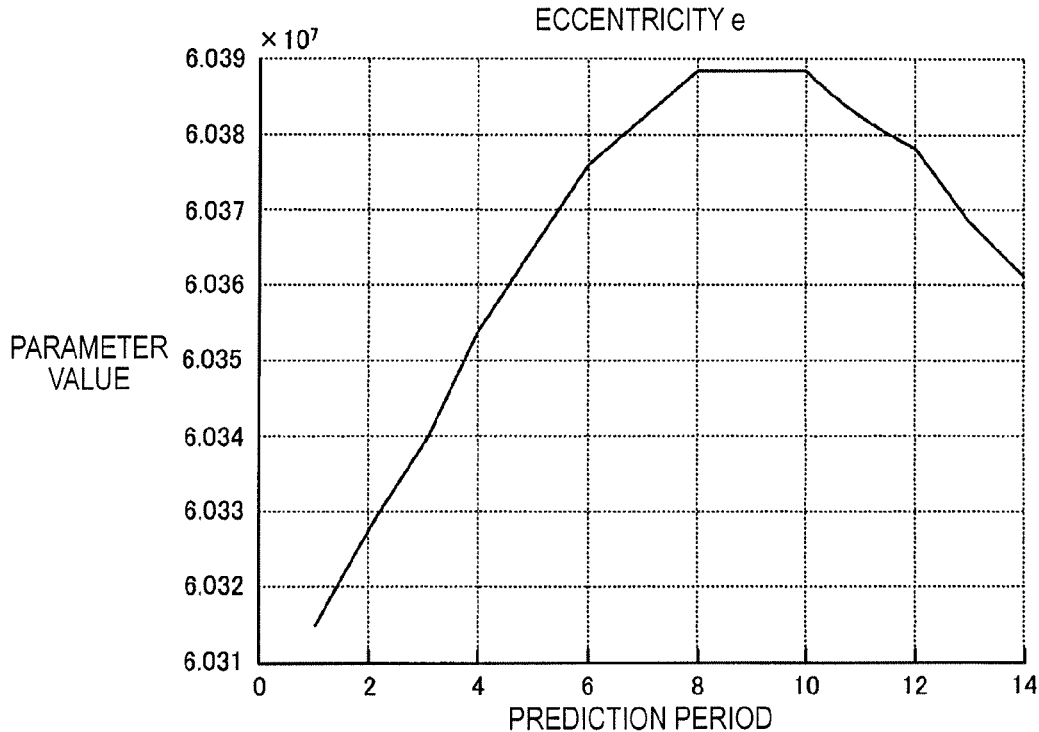
FIG. 10 is a graph illustrating an example of a temporal variation of a parameter value.
Figure 11:
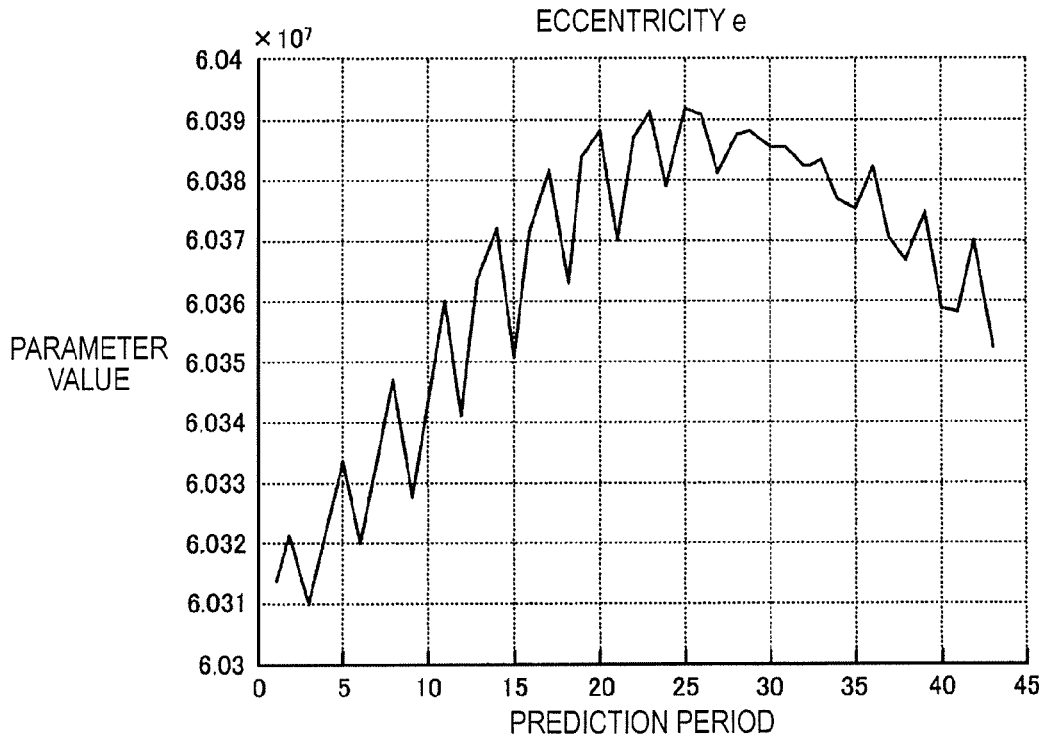
FIG. 11 is a graph illustrating an example of a temporal variation of a parameter value.

FIGS. 10 and 11 are graphs illustrating examples of the temporal variation when the value of eccentricity "e" for the GPS satellite SV1 is calculated using different prediction period lengths. FIG. 10 shows the calculation result using the prediction period length of 12 hours and FIG. 11 shows the calculation result using the prediction period length of 4 hours. As a result, when the prediction period length is set to 12 hours, it is suitable for the quadratic-curve temporal variation pattern. On the contrary, when the prediction period length is set to 4 hours, it is roughly suitable for the quadratic-curve temporal variation pattern, but locally suitable for the periodic temporal variation pattern. Accordingly, it can be seen that it is necessary to compress the same parameter using different compression methods depending on the prediction period lengths.

Figure 12:
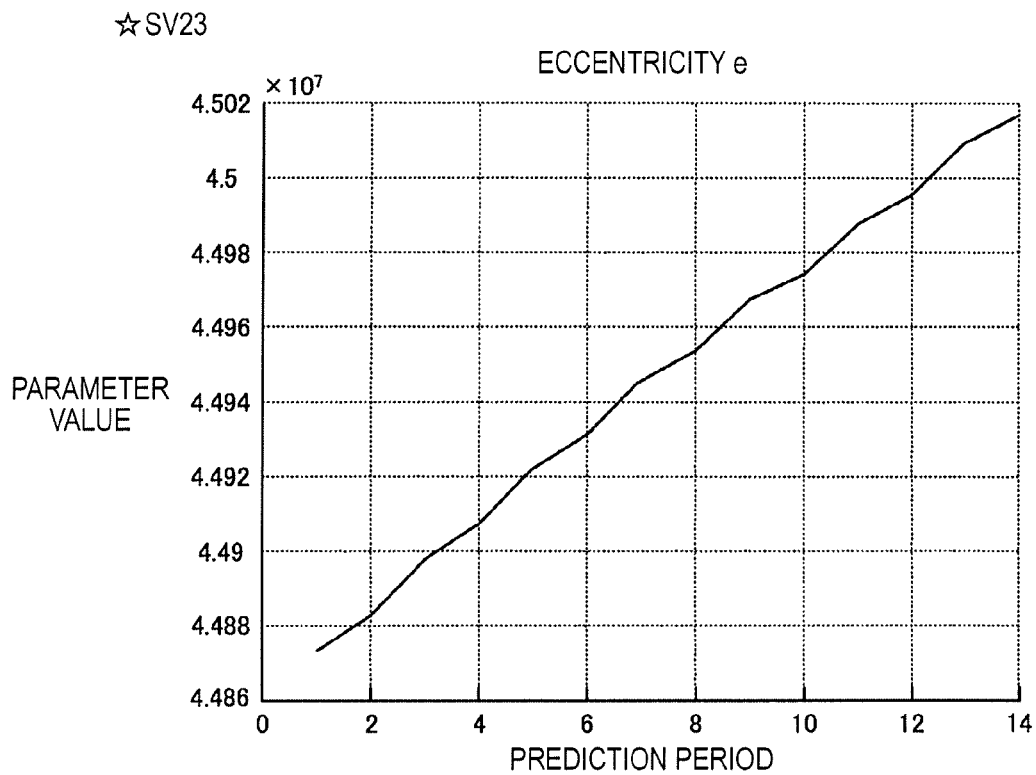
FIG. 12 is a graph illustrating an example of a temporal variation of a parameter value.
Figure 13:
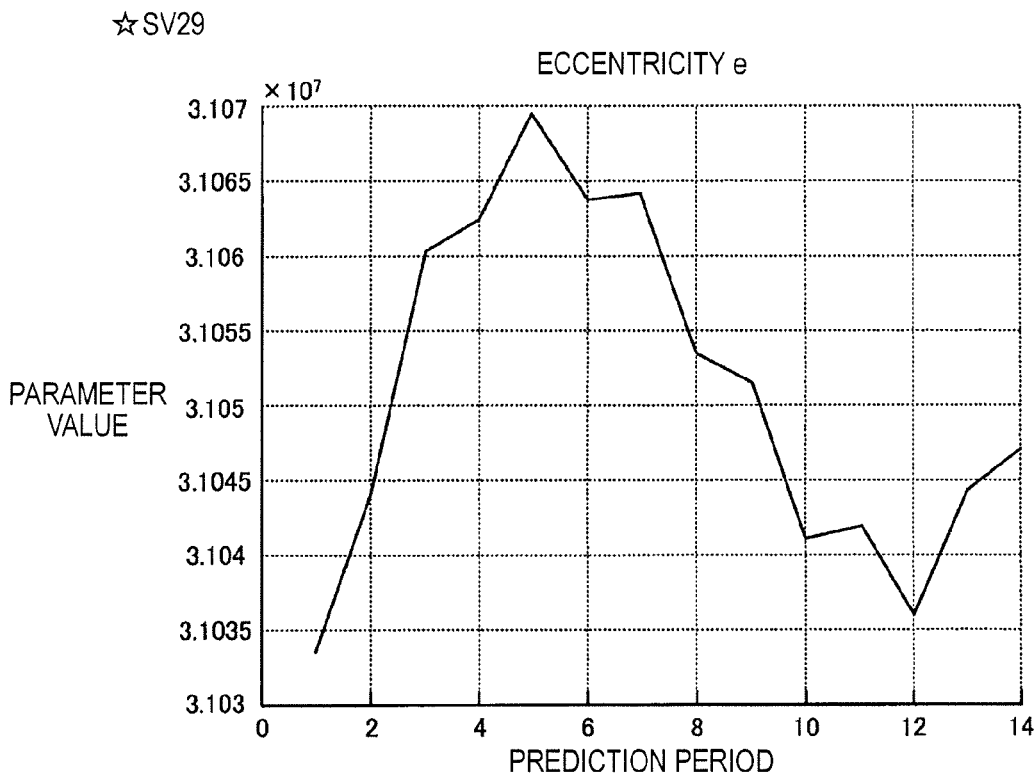
FIG. 13 is a graph illustrating an example of a temporal variation of a parameter value.

FIGS. 12 and 13 are graphs illustrating examples of the temporal variation when the value of eccentricity "e" is calculated for different GPS satellites SV. FIG. 12 shows the calculation result for the GPS satellite SV23 and FIG. 13 shows the calculation result for the GPS satellite SV29. The prediction period lengths are all set to 12 hours. As a result, the calculation result for the GPS satellite SV23 is suitable for the linear temporal variation pattern, but the calculation result for the GPS satellite SV29 is suitable for a cubic temporal variation pattern. Accordingly, it can be seen that it is necessary to compress the same parameter using different compression methods depending on the GPS satellites.

3. Server System

3-1. Functional Configuration

Figure 14:
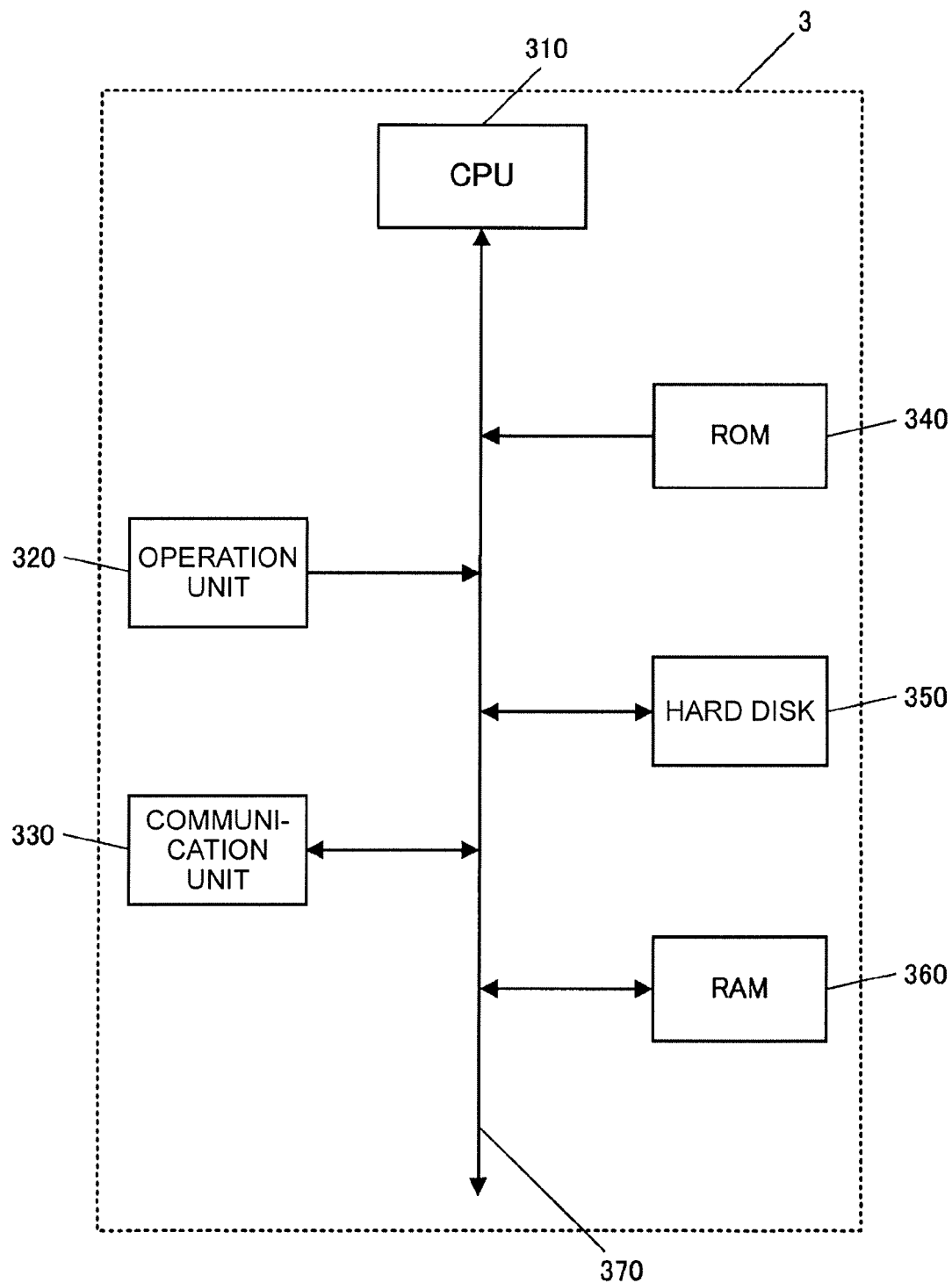
FIG. 14 is a block diagram illustrating the functional configuration of a server system.

FIG. 14 is a block diagram illustrating the functional configuration of the server system 3. The server system 3 is a computer system which includes a CPU (Central Processing Unit) 310, an operation unit 320, a communication unit 330, a ROM (Read Only Memory) 340, a hard disk 350, and a RAM (Random Access Memory) 360 and in which the units are connected to each other with an additional bus 370.

The CPU 310 is a processor generally controlling the units of the server system 3 in accordance with a system program stored in the ROM 340. In this embodiment, the CPU 310 performs a process of providing the created compressed long-term predicted ephemeris to the mobile phone 4 in accordance with a compressed long-term predicted ephemeris providing program 341 stored in the ROM 340.

The operation unit 320 is an input device receiving an operation instruction from an administrator of the server system 3 and outputting a signal corresponding to the operation to the CPU 310. This function is embodied, for example, by a keyboard, buttons, a mouse, and the like.

The communication unit 330 is a communication device exchanging a variety of data used in the system with the external system 2 or the mobile phone 4 via a communication network such as the Internet.

The ROM 340 is a read-only nonvolatile memory device and stores various programs such as a system program for allowing the CPU 310 to control the server system 3, a program for providing the compressed long-term predicted ephemeris to the mobile phone 4, and a program for creating the compressed long-term predicted ephemeris and various data.

The hard disk 350 is a memory device which data can be read from and written to using a magnetic head or the like and stores programs or data for performing various functions of the server system 3, similarly to the ROM 340.

The RAM 360 is a readable-writable volatile memory device and constitutes a work area temporarily storing various processing programs such as the system program and the compressed long-term predicted ephemeris providing program executed by the CPU 310, data in process of various processes, processing results, and the like.

3-2. Data Structure

Figure 15:
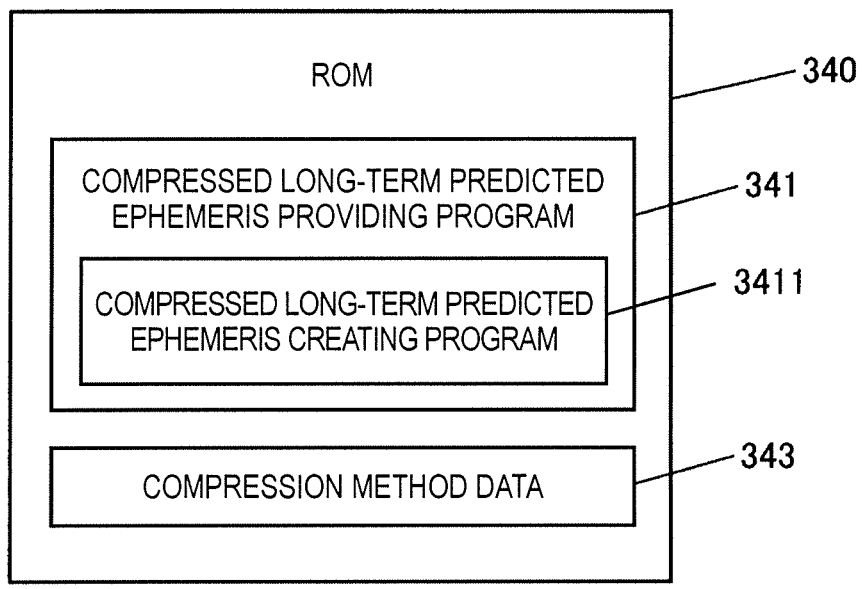
FIG. 15 is a diagram illustrating an example of data stored in a ROM of the server system.

FIG. 15 is a diagram illustrating an example of data stored in the ROM 340. The ROM 340 stores a compressed long-term predicted ephemeris providing program 341 read and executed in a compressed long-term predicted ephemeris providing process (see FIG. 22) by the CPU 310 and compression method data 343. The compressed long-term predicted ephemeris providing program 341 includes a compressed long-term predicted ephemeris creating program 3411 executed in a compressed long-term predicted ephemeris creating process (see FIGS. 23 and 24) as a sub routine.

The compressed long-term predicted ephemeris providing process is a process of allowing the CPU 310 to periodically create the compressed long-term predicted ephemeris and transmitting the created compressed long-term predicted ephemeris to the mobile phone 4 as a request source when receiving a request signal for the compressed long-term predicted ephemeris from the mobile phone 4. The compressed long-term predicted ephemeris providing process will be described in detail later with reference to a flowchart.

The compressed long-term predicted ephemeris creating process is a process of allowing the CPU 310 to create the compressed long-term predicted ephemeris in accordance with the above-mentioned principle. In this embodiment, the CPU 310 creates the compressed long-term predicted ephemeris every four hours. Specifically, plural types of long-term predicted ephemeris are created in which the creation period of one week is divided into the predetermined prediction periods such as 4 hours, 6 hours, and 8 hours using the period from the creation time of the compressed long-term predicted ephemeris to the time after one week.

The CPU 310 creates temporal variation pattern data representing the temporal variation patterns of the parameters of the satellite orbit parameter, the clock correcting parameter, and the reliability parameter and compressed long-term predicted ephemeris including the compressed predicted ephemeris including the compressed parameter values of the parameters in the prediction periods. The compressed long-term predicted ephemeris creating process will also be described in detail later with reference to a flowchart.

FIG. 17 is a diagram illustrating a data structure of the compression method data 343. The compression method data 343 is data in which the compression methods of the parameters are determined and in which the temporal variation patterns 3431 are correlated with the parameter value compressing methods 3433. For example, the temporal variation pattern of "pattern C (periodic variation)" is correlated with the compression method for the periodic variation.

Figure 16:
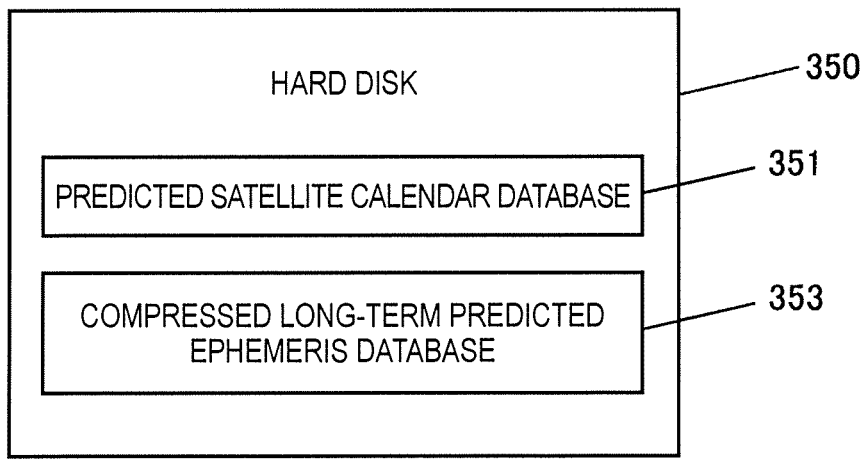
FIG. 16 is a diagram illustrating an example of data stored in a hard disk of the server system.

FIG. 16 is a diagram illustrating an example of data stored in the hard disk 350. The hard disk 350 stores a predicted satellite calendar database 351 and a compressed long-term predicted ephemeris database 353.

Figure 18:
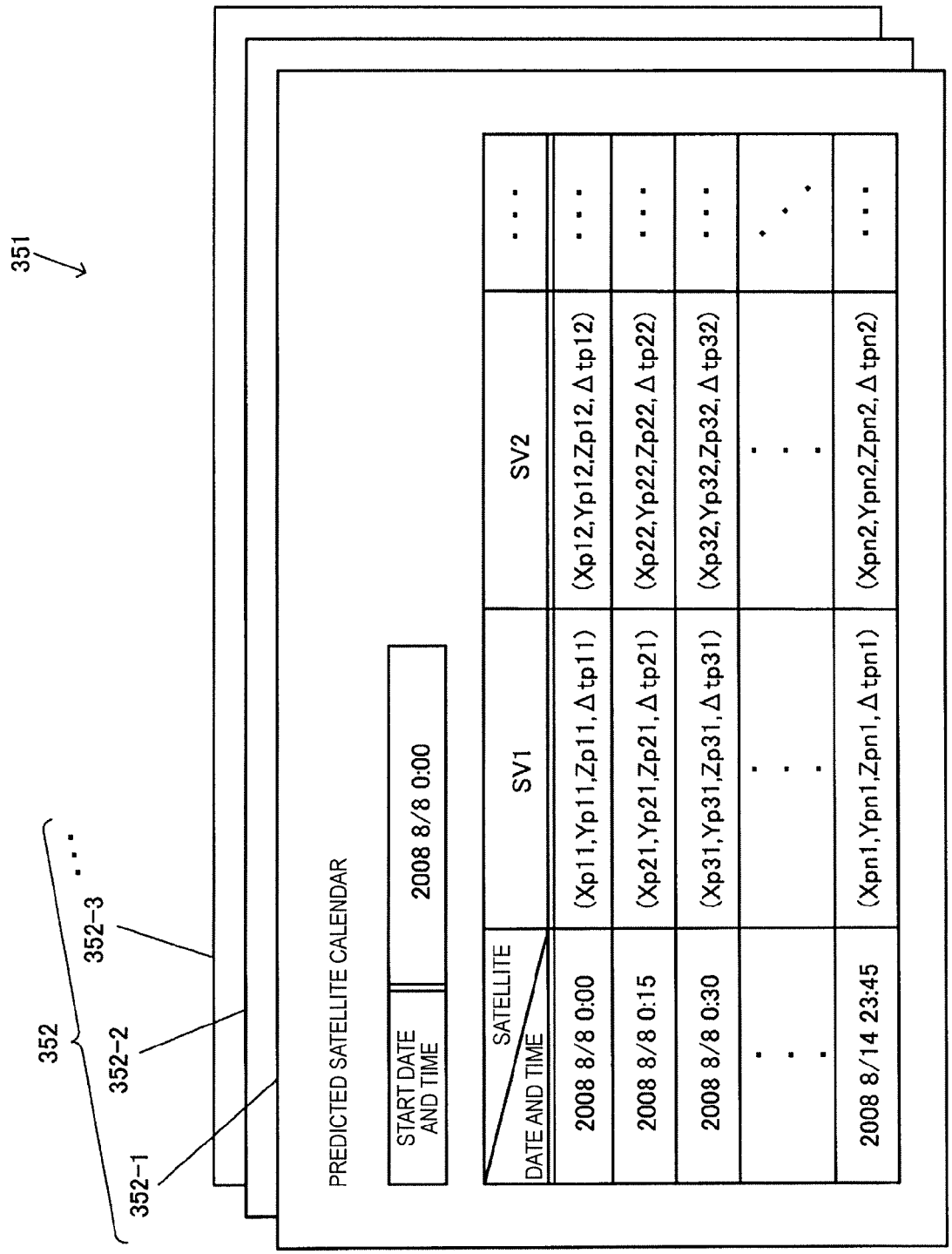
FIG. 18 is a diagram illustrating an example of a data configuration of a predicted satellite calendar database.

FIG. 18 is a diagram illustrating the data structure of the predicted satellite calendar database 351. The predicted satellite calendar database 351 is a database storing plural predicted satellite calendars 352 (352-1, 352-2, 352-3, . . . ) in time series.

The predicted satellite calendars 352 are discrete data in which the predicted positions and the predicted clock errors for one week of the GPS satellites SV are arranged with the interval of 15 minutes and data collected every start time. For example, the predicted satellite calendar 352-1 is data of which the prediction start time is "0:00 of Aug. 8, 2008". The predicted position of the GPS satellite "SV2" at 0:30 of Aug. 8, 2008", is "(Xp32, Yp32, Zp32)" and the prediction error of the atomic clock is "Δtp32".

The CPU 310 periodically (for example, every 4 hours) receives the predicted satellite calendars from the external system 2. Then, the CPU performs a process of processing a data format to cumulatively store the received predicted satellite calendars in the predicted satellite database 351. Specifically, plural predicted satellite calendars 352 including data having different start times and the same creation time (for example, one week) of the long-term predicted ephemeris are created and cumulatively stored in the predicted satellite calendar database 351.

Figure 19:
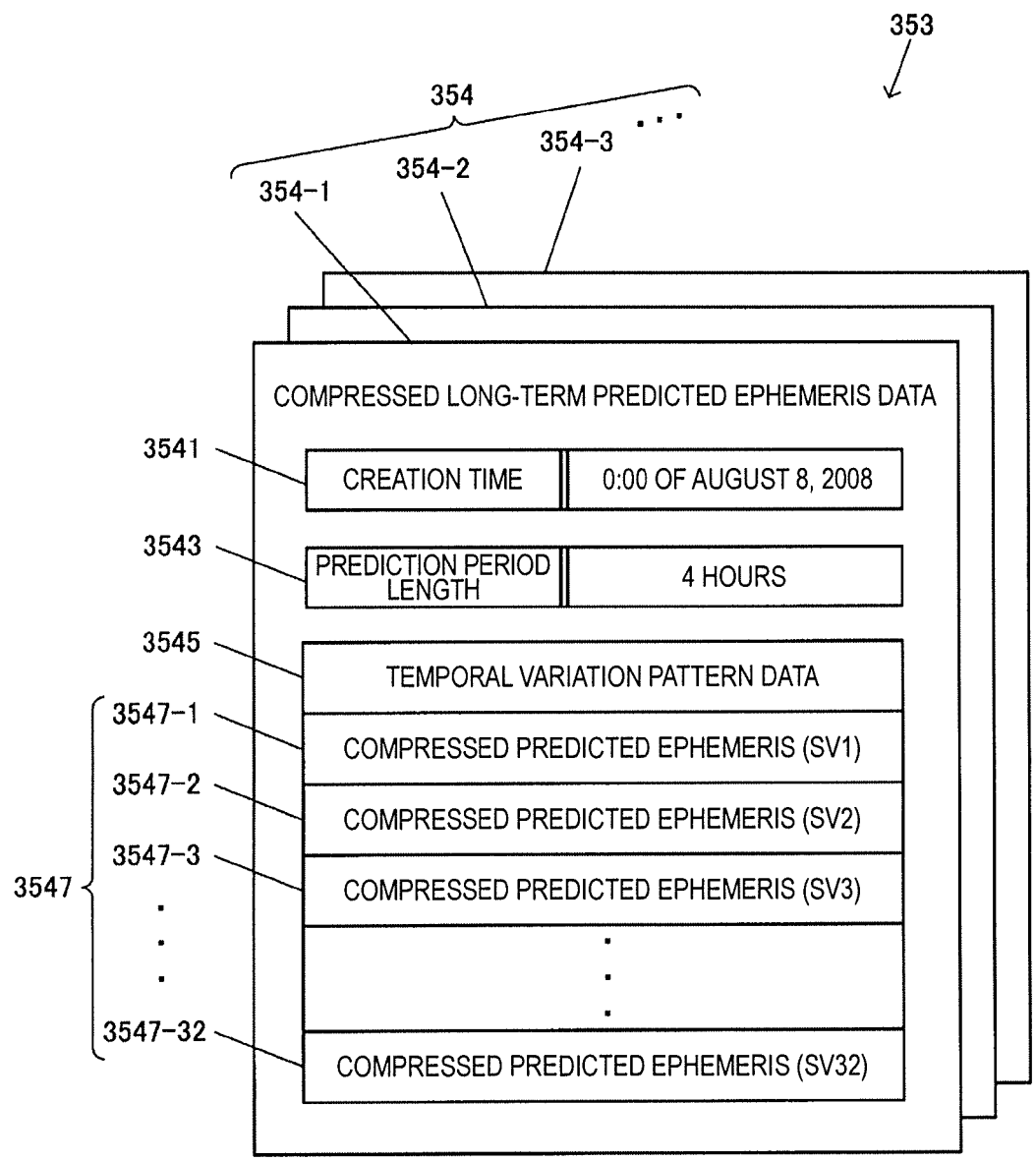
FIG. 19 is a diagram illustrating an example of a data configuration of a compressed long-term predicted ephemeris database.

FIG. 19 is a diagram illustrating the data structure of the compressed long-term predicted ephemeris database 353. The compressed long-term predicted ephemeris database 353 is a database storing plural compressed long-term predicted ephemeris data 354 (354-1, 354-2, 354-3, . . . ).

In the compressed long-term predicted ephemeris data 354, the creation times 3541 of the compressed long-term predicted ephemeris data, the prediction period lengths 3543 which are the lengths of the prediction periods, the temporal variation pattern data 3545, and the compressed predicted ephemeris 3547 (3547-1 to 3547-32) of the GPS satellites SV (SV1 to SV32) are correlated with each other.

FIG. 20 is a diagram illustrating the data structure of the temporal variation pattern data 3545. The temporal variation pattern data 3545 includes the temporal variation patterns of the satellite orbit parameter, the clock correcting parameter, and the reliability parameter for the GPS satellites SV (SV1 to SV32). As shown in the compression method data 343 of FIG. 17, since the temporal variation patterns are correlated with the compression methods, the temporal variation pattern data 3545 can be said to be data including the identification information of the compression methods of the parameter values.

It should be noted that the temporal variation pattern and the compression method of the same parameter vary depending on the GPS satellites. For example, paying attention to the eccentricity "e", since the temporal variation pattern for the GPS satellite SV1 is "pattern A (linear variation)", the compression method for the linear variation is used for the GPS satellite SV1. On the contrary, since the temporal variation pattern for the GPS satellite SV2 is "pattern B (quadratic-curve variation)", the compression method for the quadratic-curve variation is used for the GPS satellite SV2.

FIG. 21 is a diagram illustrating the data structure of the compressed predicted ephemeris 3547. The compressed predicted ephemeris 3547 (3547-1, 3547-2, ... and 3547-32) include compressed parameter values of the satellite orbit parameters, the clock correcting parameters, and the reliability parameter in the respective prediction periods.

The compressed predicted ephemeris 3547-1 shown in FIG. 21 is compressed predicted ephemeris for the GPS satellite SV1, in which the original values (parameter values) of the parameters are stored for the first prediction period but the compressed values (compressed parameter values) of the parameters are stored for the second to twenty-eighth prediction periods.

3-3. Flow of Processes

Figure 22:
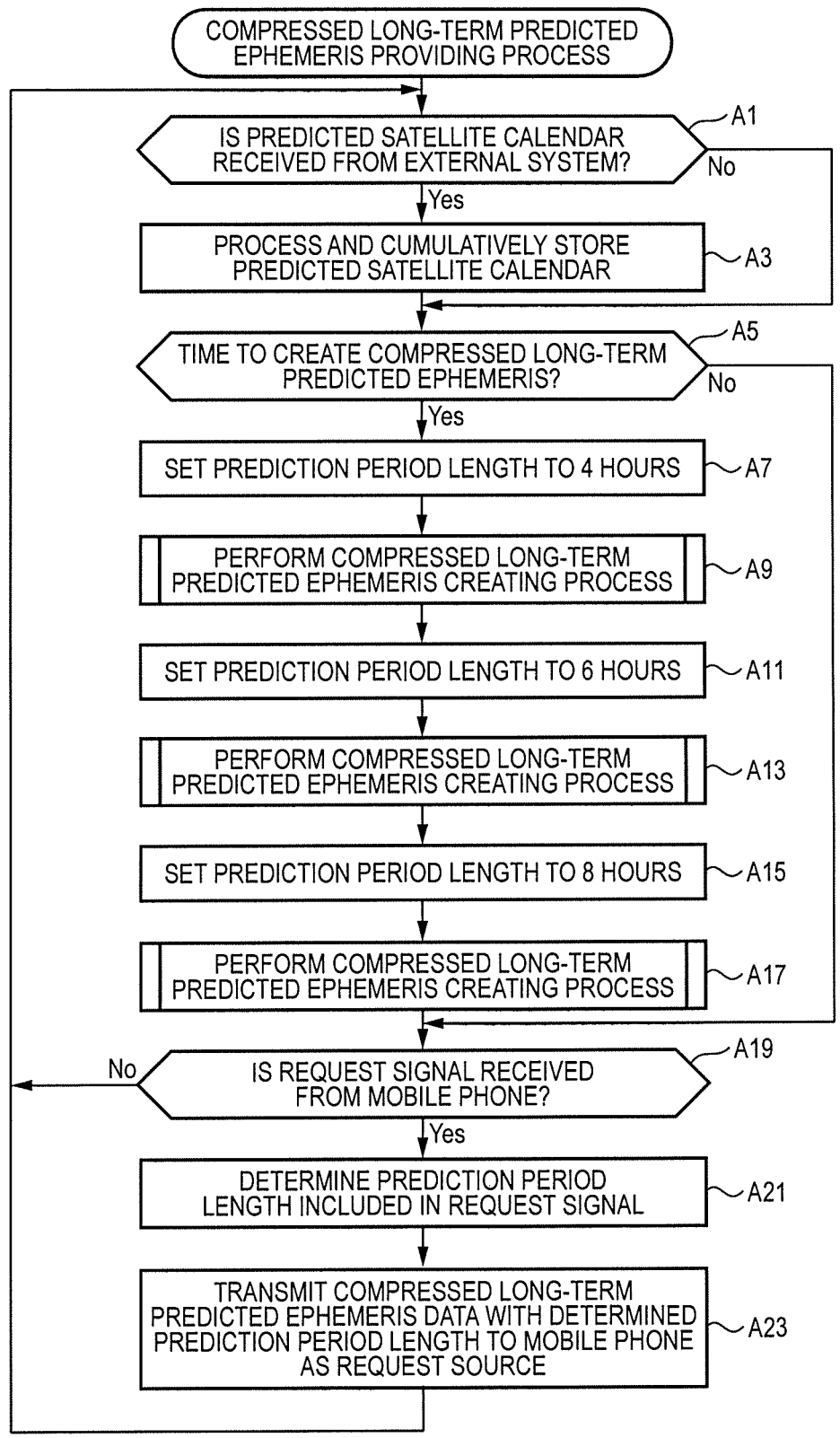
FIG. 22 is a flowchart illustrating the flow of a compressed long-term predicted ephemeris providing process.

FIG. 22 is a flowchart illustrating a flow of the compressed long-term predicted ephemeris providing process performed in the server system 3 by allowing the CPU 310 to read and execute the compressed long-term predicted ephemeris providing program 341 stored in the ROM 340.

First, the CPU 310 determines whether the predicted satellite calendars are received from the external system 2 (step A1). When it is determined that they are not received (NO in step A1), the process of step A5 is performed.

When it is determined that they are received (YES in step A1), the CPU 310 processes the data format so as to cumulatively store the received predicted satellite calendars in the predicted satellite calendar database 351. Specifically, the CPU creates plural predicted satellite calendars 352 including data having different start times and corresponding to the same period as the creation period (for example, one week) of the long-term predicted ephemeris and cumulatively stores the created plural predicted satellite calendars 352 in the predicted satellite calendar database 351 (step A3).

The CPU 310 determines whether it is time to create the compressed long-term predicted ephemeris (step A5). In this embodiment, it is assumed that the compressed long-term predicted ephemeris is created once every 4 hours. When it is determined that it is not yet the time to create the compressed long-term predicted ephemeris (NO in step A5), the CPU 310 performs the process of step A19.

When it is determined that it is the time to create the compressed long-term predicted ephemeris (YES in step A5), the CPU 310 sets the prediction period length to 4 hours (step A7). Then, the CPU 310 performs the compressed long-term predicted ephemeris creating process by reading and executing the compressed long-term predicted ephemeris creating program 3411 stored in the ROM 340 (step A9).

Figure 23:
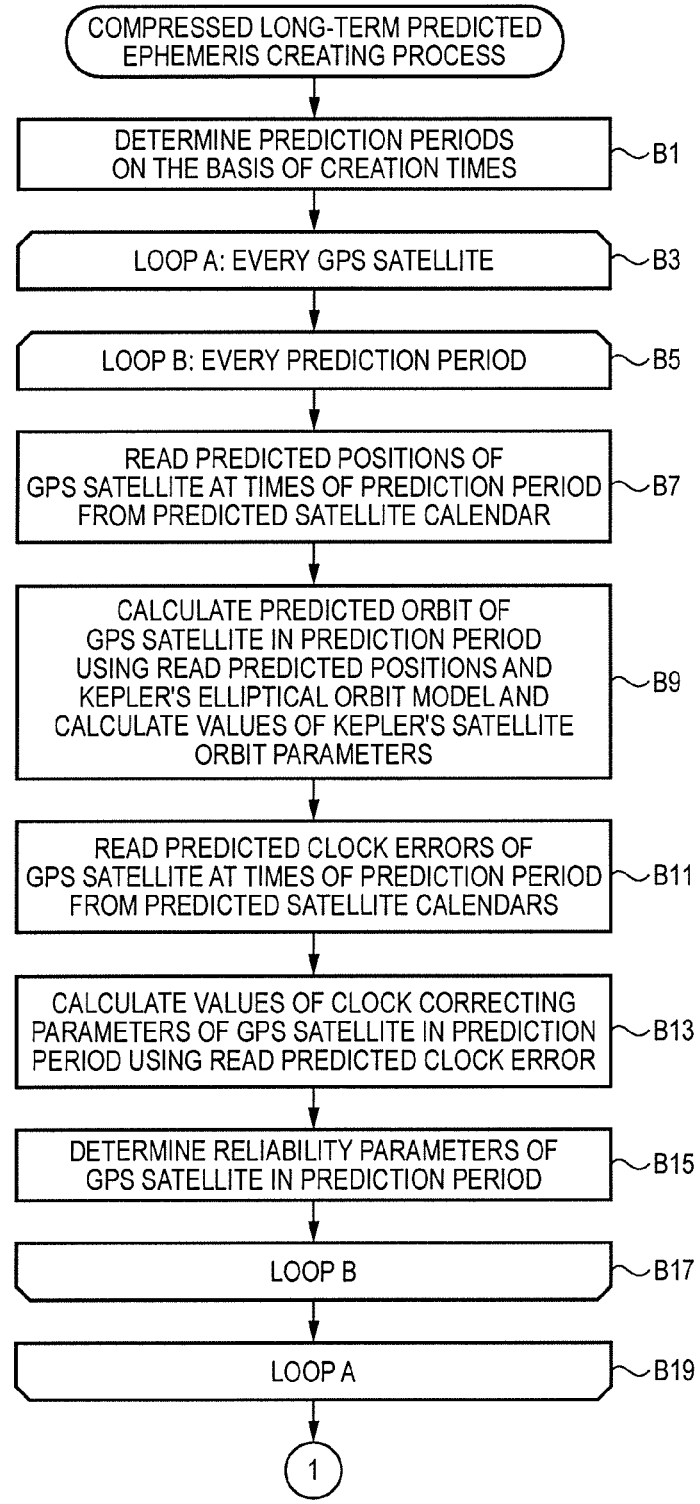
FIG. 23 is a flowchart illustrating the flow of a compressed long-term predicted ephemeris creating process.
Figure 24:
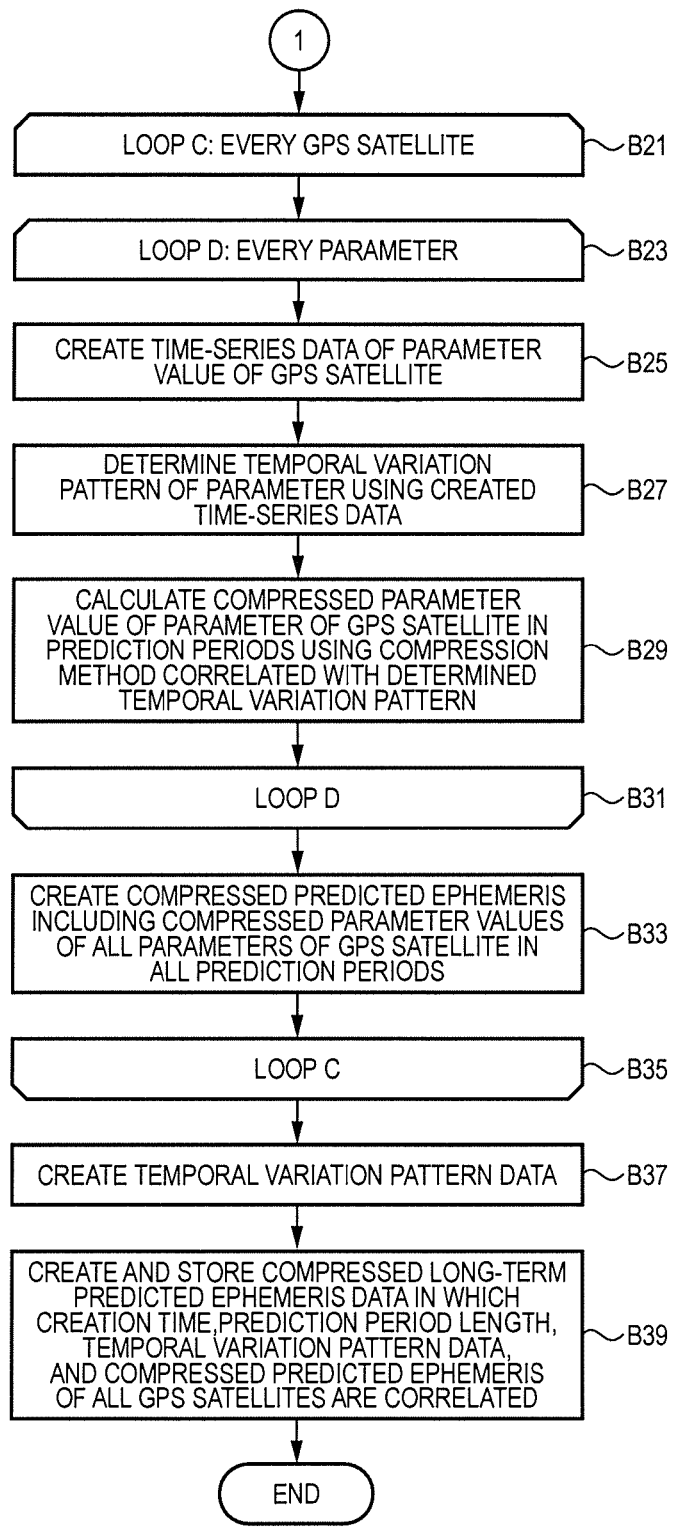
FIG. 24 is a flowchart illustrating the flow of the compressed long-term predicted ephemeris creating process.

FIGS. 23 and 24 are flowcharts illustrating the flow of the compressed long-term predicted ephemeris creating process.

First, the CPU 310 determines the prediction periods on the basis of the creation time (current time) of the compressed long-term predicted ephemeris (step B1). Then, the CPU 310 performs the processes of loop A on the respective GPS satellites (steps B3 to B19). In the processes of loop A, the CPU 310 performs the processes of loop B for the prediction periods determined in step B1 (steps B5 to B17).

In the processes of loop B, the CPU 310 reads the predicted positions of the corresponding GPS satellite SV at the times (the times with an interval of 15 minutes stored in the predicted satellite calendars 352 and included in the corresponding prediction period) of the corresponding prediction period for the corresponding GPS satellite from the latest predicted satellite calendar 352 stored in the predicted satellite calendar database 351 of the hard disk 350 (step B7).

Then, the CPU 310 calculates the predicted orbit of the corresponding GPS satellite SV in the prediction period using the predicted positions read in step B7 and Kepler's elliptical orbit model, and acquires the values of Kepler's satellite orbit parameters (step B9).

Thereafter, the CPU 310 reads the predicted clock error of the corresponding GPS satellite at the times of the corresponding prediction period from the latest predicted satellite calendar 352 (step B11). Then, the CPU 310 acquires the values of the clock correcting parameters of the GPS satellite in the corresponding prediction period using the read predicted clock error (step B13).

The predicted clock error "$\Delta t$" at the time "$t$" can be approximated by Expression (1) using the reference time "$t_c$" of the satellite clock, the offset "$a_0$" of the satellite clock, the drift "$a_1$" of the satellite clock, and the drift "$a_2$" of the satellite clock frequency, which are the clock correcting parameters.

$$\Delta t = a_0 + a_1(t-t_c) + a_2(t-t_c)^2 \quad (1)$$

Expression (1) is a clock error model expression for approximating a temporal variation of the predicted clock error. By performing the approximate calculation, for example, by the use of the least square method using the predicted clock errors "$\Delta t$" at the times included in the predicted satellite calendar 352 as sampling data, the values of the clock correcting parameters can be calculated.

The CPU 310 determines the values of the reliability parameters (the predicted orbit reliability and the health information) of the GPS satellite in the corresponding prediction period (step B15). Then, the CPU 310 performs the processes on the next prediction period. After performing the processes of steps B7 to B15 on all the prediction periods, the CPU 310 ends the processes of loop B (step B17).

After ending the processes of loop B, the CPU 310 performs the processes on the next GPS satellite. After performing the processes of steps B5 to B17 on all the GPS satellites, the CPU 310 ends the processes of loop A (step B19).

Then, the CPU 310 performs the processes of loop C on the GPS satellites (steps B21 to B35). In the processes of loop C, the CPU 310 performs the processes of loop D on the parameters such as the satellite orbit parameter, the clock correcting parameter, and the reliability parameter (steps B23 to B31).

In the processes of loop D, the CPU 310 creates the time-series data of the corresponding parameter value of the corresponding GPS satellite (step B25). Then, the CPU 310 determines the temporal variation pattern 3431 of the corresponding parameter value using the created time-series data (step B27).

The CPU 310 calculates the compressed parameter value of the corresponding parameter of the corresponding GPS satellite using the compression method 3433 correlated to the temporal variation pattern 3431 determined in step B27 in the prediction periods with reference to the compression method data 343 stored in the ROM 340 (step B29). Then, the CPU 310 performs the processes on the next parameter.

After performing the processes of step B25 to B29 on all the parameters, the CPU 310 ends the process of loop D (step 331). Then, the CPU 310 creates the compressed predicted ephemeris 3547 including the compressed parameter values of all the parameters in all the prediction periods for the corresponding GPS satellite (step B33). The CPU 310 performs the processes on the next GPS satellite.

After performing the processes of steps B23 to B33 on all the GPS satellites, the CPU 310 ends the processes of loop C (step B35). Thereafter, the CPU 310 creates the temporal variation pattern data 3545 for the parameters of the GPS satellites on the basis of the temporal variation pattern determined in step B27 (step B37).

The CPU 310 creates the compressed long-term predicted ephemeris data 354, in which the creation times 3541, the prediction period lengths 3543, the temporal variation pattern data 3545 created in step B37, and the compressed predicted ephemeris 3547 created in step B33 for all the GPS satellites are correlated with each other, and cumulatively stores the created compressed long-term ephemeris data in the compressed long-term predicted ephemeris database 353 of the hard disk 350 (step B39). The CPU 310 ends the compressed long-term predicted ephemeris creating process.

Returning to the compressed long-term predicted ephemeris providing process shown in FIG. 22 again, after performing the compressed long-term predicted ephemeris creating process in step A9, the CPU 310 repeats the compressed long-term predicted ephemeris creating process while changing the prediction period length (steps A11 to A17). Specifically, the compressed long-term predicted ephemeris creating process is performed (steps A13 and A17) while sequentially setting the prediction period length to 6 hours and 8 hours (steps A11 and A15). That is, the plural compressed long-term predicted ephemeris having different prediction period lengths are created and stored.

Then, the CPU 310 determines whether a request signal for the compressed long-term predicted ephemeris is received from the mobile phone 4 (step A19). When it is determined that the request signal is not received (NO in step A19), the process of step A1 is repeated.

When it is determined that the request signal is received (YES in step A19), the CPU 310 determines the prediction period length included in the request signal (step A21). Then, the CPU 310 transmits the compressed long-term predicted ephemeris data 354 of the prediction period length determined in step A21, out of the newest compressed long-term predicted ephemeris data 354 stored in the compressed long-term predicted ephemeris database 353 of the hard disk 350, to the mobile phone 4 as the request source (step A23). Thereafter, the CPU 310 repeats the process of step A1.

4. Mobile Phone 4-1. Functional Configuration

Figure 25:
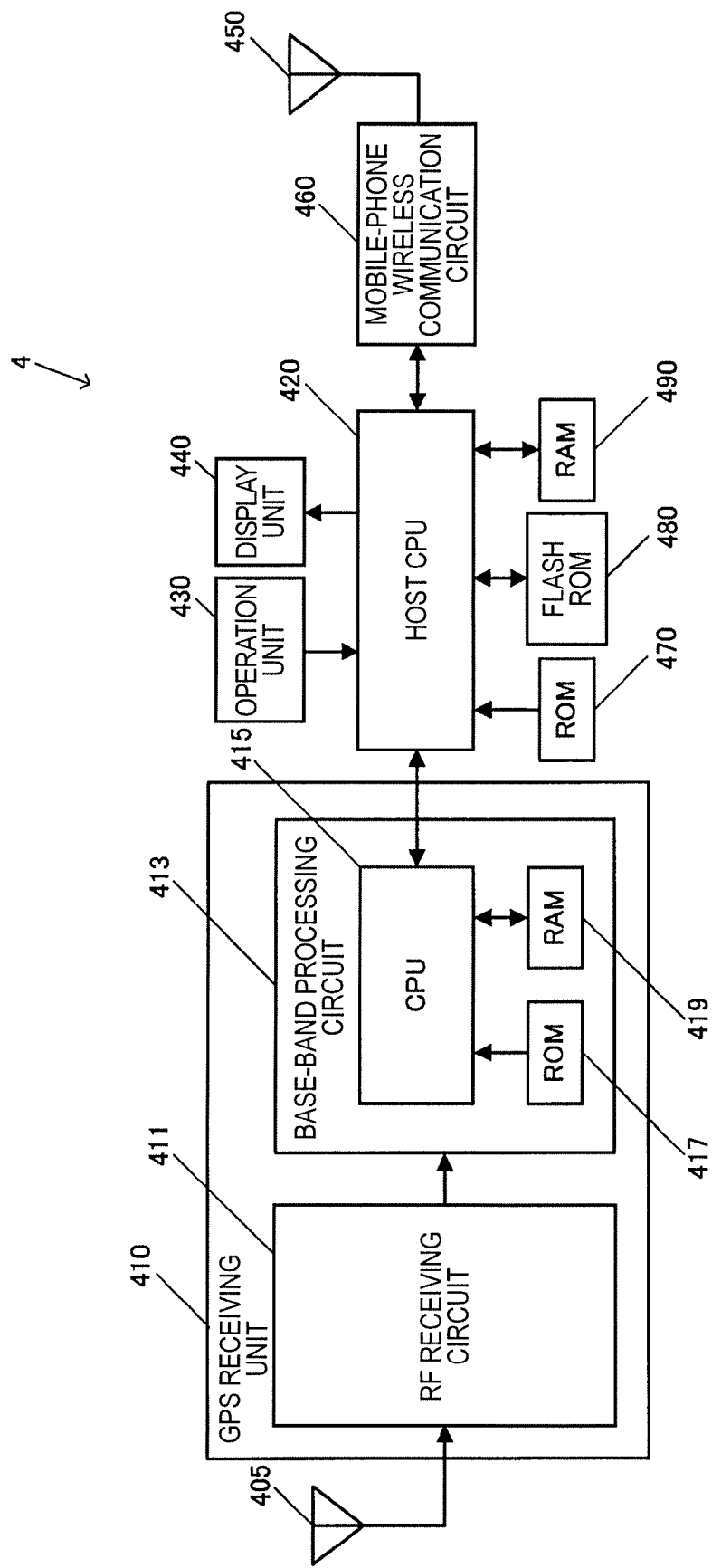
FIG. 25 is a block diagram illustrating the functional configuration of a mobile phone.

FIG. 25 is a block diagram illustrating the functional configuration of the mobile phone 4. The mobile phone 4 includes a GPS antenna 405, a GPS receiving unit 410, a host CPU 420, an operation unit 430, a display unit 440, a mobile-phone antenna 450, a mobile-phone wireless communication circuit 460, a ROM 470, a flash ROM 480, and a RAM 490.

The GPS antenna 405 is an antenna receiving RF (Radio Frequency) signals including the GPS satellite signals transmitted from the GPS satellites SV and outputs the received signals to the GPS receiving unit 410. The GPS satellite signals are communication signals of 1.57542 [GHz] modulated with PRN (Pseudo Random Noise) codes which are a kind of spread code which differs for each satellite using a direct spectrum spread method. The PRN codes are pseudo random noise codes with a repetition period of 1 ms having a tip with a code length of 1023 as one PN frame.

The GPS receiving unit 410 is a position calculating circuit calculating a position on the basis of the signals output from the GPS antenna 405 and is a functional block corresponding to a so-called GPS receiver. The GPS receiving unit 410 includes an RF (Radio Frequency) receiving circuit 411 and a base-band processing circuit 413. The RF receiving circuit 411 and the base-band processing circuit 413 may be manufactured as different LSI (Large Scale Integration) chips or may be manufactured as one chip.

The RF receiving circuit 411 is a circuit block processing an RF signal and creates an oscillation signal for RF signal multiplication by dividing or multiplying a predetermined local oscillation signal. The RF receiving circuit down-converts the RF signal into an intermediate frequency signal (hereinafter, referred to as "IF (Intermediate Frequency) signal") by multiplying the created oscillation signal by the RF signal output from the GPS antenna 405. Then, the RF receiving circuit amplifies the IF signal, then converts the amplified IF signal into a digital signal with an AD (Analog-Digital) converter, and outputs the digital signal to the base-band processing circuit 413.

The base-band processing circuit 413 is a circuit unit capturing and extracting the GPS satellite signals by performing a correlation process or the like on the IF signal output from the RF receiving circuit 411. The base-band processing circuit 413 includes a CPU 415 as a processor and a ROM 417 and a RAM 419 as a memory. The CPU 415 captures and extracts the GPS satellite signal using the complete long-term predicted ephemeris acquired by allowing the host CPU 420 to decompress the compressed long-term predicted ephemeris.

The host CPU 420 is a processor comprehensively controlling the units of the mobile phones 4 on the basis of various programs such as a position calculating program or a system program stored in the ROM 470. The host CPU 420 decodes data from the GPS satellite signal captured and extracted by the base-band processing circuit 413, extracts navigation messages or time information, and performs a position calculating operation. The host CPU creates a navigation picture in which the GPS calculated positions acquired by the position calculating operation are plotted and displays the created navigation picture on the display unit 440.

The operation unit 430 is an input device including, for example, a touch panel or a button switch and outputs a signal corresponding to a pushed icon or button to the host CPU 420. Various instructions such as a communication request, a mail transmitting and receiving request, and a GPS start request are input by operating the operation unit 430.

The display unit 440 is a display device including an LCD (Liquid Crystal Display) and displaying various data based on display signals input from the host CPU 420. The navigation picture or the time information is displayed on the display unit 440.

The mobile-phone antenna 450 is an antenna transmitting and receiving a mobile-phone wireless signal to and from a wireless base station installed by a communication service provider of the mobile phone 4.

The mobile-phone wireless communication circuit 460 is a communication circuit unit of a mobile phone including an RF conversion circuit and a base-band processing circuit and transmits and receives communication or mail by modulating and demodulating the mobile-phone wireless signal.

The ROM 470 is a read-only nonvolatile memory device and stores various data or programs such as a system program allowing the host CPU 420 to control the mobile phone 4, a position calculating program for performing the position calculating operation, and a navigation program for performing a navigation function.

The flash ROM 480 is a readable and writable nonvolatile memory device and stores various programs or data for allowing the host CPU 420 to control the mobile phone 4, similarly to the ROM 470. The data stored in the flash ROM 480 is not deleted even when the mobile phone 4 is turned off.

The RAM 490 is a readable and writable volatile memory device and serves as a work area temporarily storing various programs such as the system program and the position calculating program executed by the host CPU 420, data in process of various processes, and process results.

4-2. Data Structure

Figure 26:
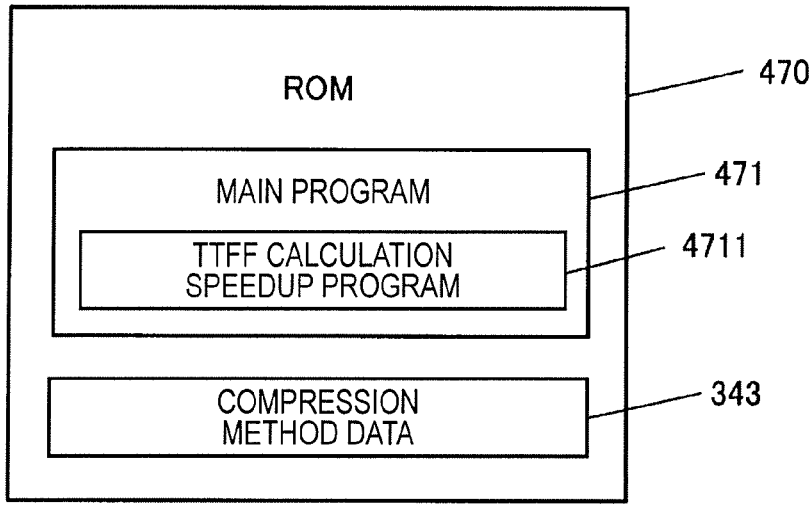
FIG. 26 is a diagram illustrating an example of data stored in a ROM of the mobile phone.

FIG. 26 is a diagram illustrating an example of data stored in the ROM 470. The ROM 470 stores a main program 471 read and executed as a main process (see FIG. 29) by the host CPU 420 and the compression method data 343. The main program 471 includes a TTFF calculation speedup program 4711 executed in a TTFF calculation speedup process (see FIG. 30) as a sub routine.

The main process is performed by the host CPU 420 and includes a process of calculating a position of the mobile phone 4 and a process of speeding up the TTFF calculation after turning on the mobile phone 4, in addition to the processes of transmitting and receiving communication or mail which is the inherent function of the mobile phone 4. The main process will be described later in detail with reference to a flowchart.

The TTFF calculation speedup process is a process of reconstructing the complete long-term predicted ephemeris data 481 by allowing the host CPU 420 to transmit a request signal for the compressed long-term predicted ephemeris data 354 to the server system 3 and to decompress the compressed long-term predicted ephemeris data 354 received from the server system 3. Accordingly, in the TTFF calculation, that enables to capture the GPS satellites SV using the reconstructed complete long-term predicted ephemeris data 481, thereby speeding up the TTFF calculation. The TTFF calculating speedup process will be described later in detail with reference to a flowchart.

Figure 27:
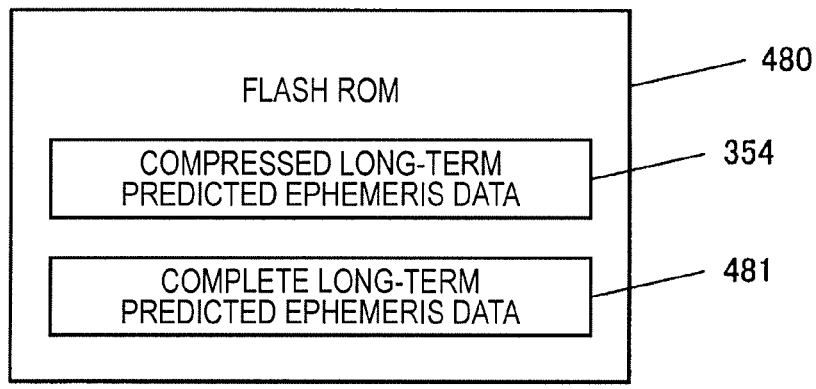
FIG. 27 is a diagram illustrating an example of data stored in a flash ROM of the mobile phone.

FIG. 27 is a diagram of an example of data stored in the flash ROM 480. The flash ROM 480 stores the compressed long-term predicted ephemeris data 354 received from the server system 3 and the complete long-term predicted ephemeris data 481 acquired by decompressing the compressed long-term predicted ephemeris data 354. The complete long-term predicted ephemeris data 481 is data including the parameter values of the satellite orbit parameters, the clock correcting parameters, and the reliability parameters of all the GPS satellites SV in all the prediction periods.

Figure 28:
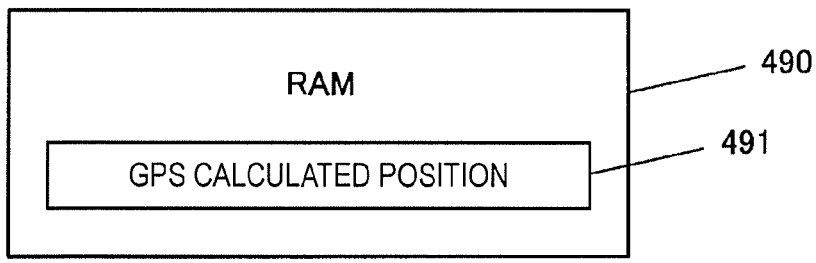
FIG. 28 is a diagram illustrating an example of data stored in a RAM of the mobile phone.

FIG. 28 is a diagram illustrating an example of data stored in the RAM 490. The RAM 490 stores the GPS calculated positions 491 acquired by the position calculating process. The GPS calculated positions 491 are updated by the host CPU 420 in the main process.

4-3. Flow of Processes

Figure 29:
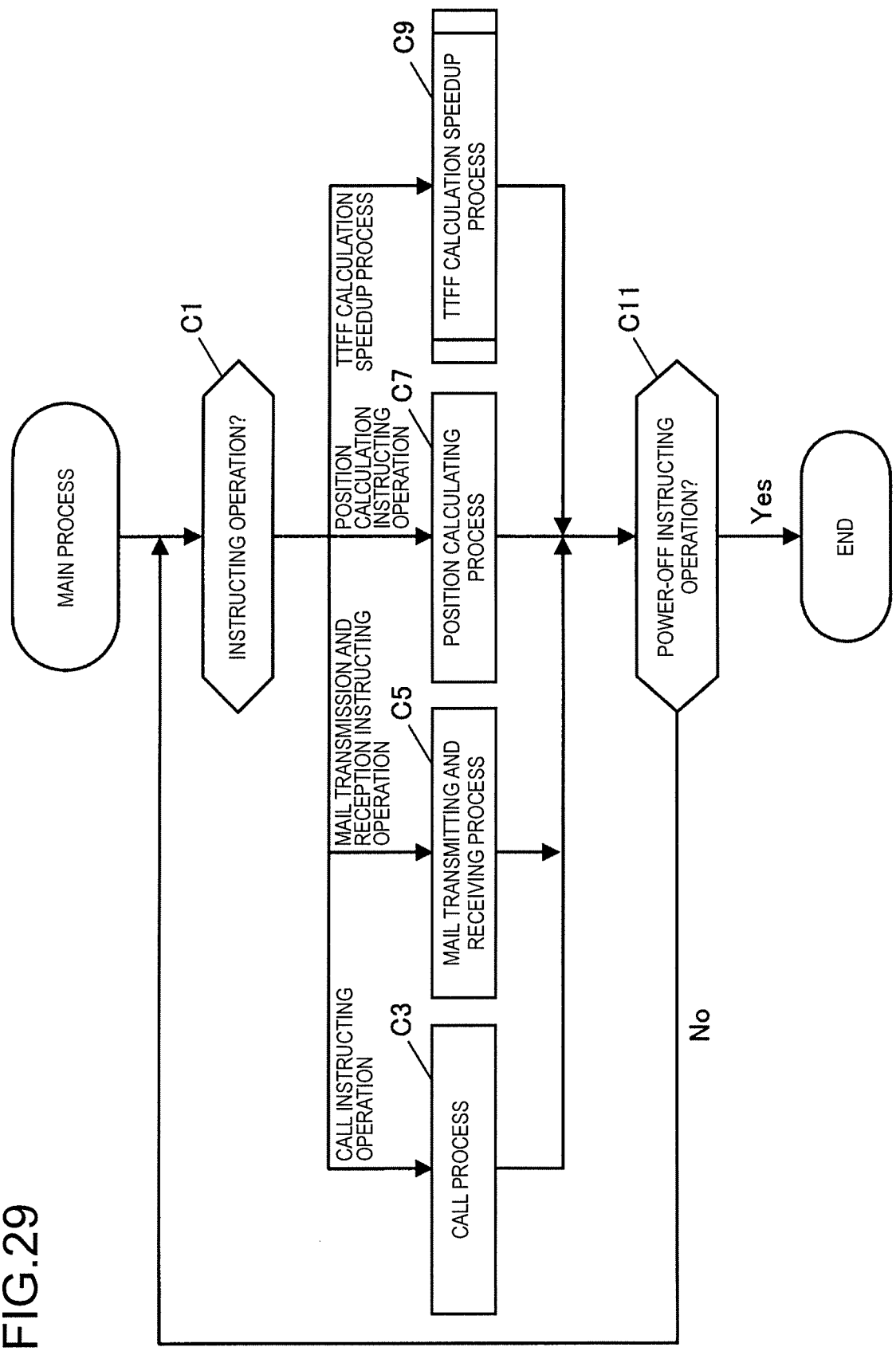
FIG. 29 is a flowchart illustrating the flow of a main process.

FIG. 29 is a flowchart illustrating the flow of the main process performed on the mobile phone 4 by allowing the host CPU 420 to read and execute the main program 471 stored in the ROM 470.

The main process is started when the host CPU 420 detects that a user turns on the mobile phone through the operation unit 430. Although not particularly stated, it is assumed during carrying out the main process that the RF signal is received by the GPS antenna 405 or the RF signal is down-converted into the IF signal by the RF receiving circuit 411 and the signals are output to the IF signal base-band processing circuit 413 at any time.

First, the host CPU 420 determines an instructing operation from the operation unit 430 (step C1). When it is determined that the instructing operation is a call instructing operation (call instructing operation in step C1), the host CPU performs a call process (step C3). Specifically, the host CPU controls the mobile-phone wireless communication circuit 460 to communicate with a wireless base station, thereby making a call communication between the mobile phone 4 and another mobile phone.

When it is determined in step C1 that the instructing operation is a mail transmission and reception instructing operation (mail transmission and reception instructing operation in step C1), the host CPU 420 performs a mail transmitting and receiving process (step C5). Specifically, the host CPU controls the mobile-phone wireless communication circuit 460 to communicate with the base station, thereby making transmission and reception of mail between the mobile phone 4 and another mobile phone.

When it is determined in step C1 that the instructing operation is a position calculation instructing operation (position calculation instructing operation in step C1), the host CPU 420 performs a position calculating process by reading and executing the position calculating program from the ROM 470 (step C7).

Specifically, the host CPU 420 controls the CPU 415 of the base-band processing circuit 413 to capture and extract the GPS satellite signal using the complete long-term predicted ephemeris data 481 stored in the flash ROM 480. Then, the host CPU performs a predetermined position calculating operation using the GPS satellite signal captured and extracted by the CPU 415. The position calculating operation may employ any known method such as a least square method or a position calculating operation using a Kalman filter. The host CPU 420 stores the GPS calculated position 491 acquired by the position calculating operation in the RAM 490.

When it is determined in step C1 that the instructing operation is a TTFF calculation speedup instructing operation (TTFF calculation speedup instructing operation in step C1), the host CPU 420 performs the TTFF calculation speedup process by reading and executing the TTFF calculation speedup program 4711 stored in the ROM 470 (step C9).

Figure 30:
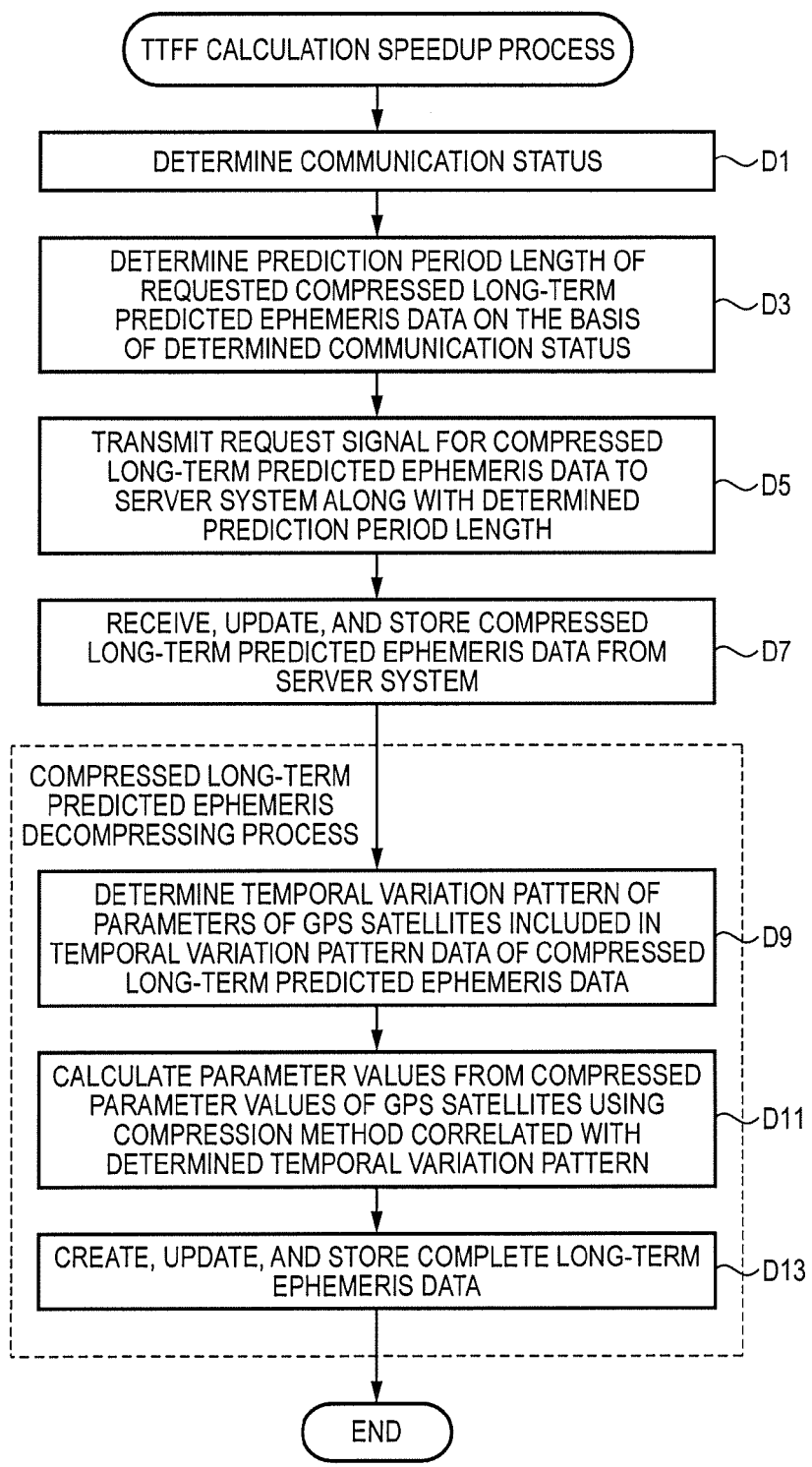
FIG. 30 is a flowchart illustrating the flow of a TTFF calculation speedup process.

FIG. 30 is a flowchart illustrating the flow of the TTFF calculation speedup process.

First, the host CPU 420 determines the communication status with the server system 3 (step D1). Then, the host CPU 420 determines the prediction period length of the compressed long-term predicted ephemeris data requested for the server system 3 on the basis of the determined communication status (step D3).

As the prediction period length is shorter, the number of the prediction period increases the number of compressed parameter values included in the compressed long-term predicted ephemeris increases and thus the amount of data of the compressed long-term predicted ephemeris also increases. When the communication status with the server system 3 is excellent, the great amount of data of the compressed long-term predicted ephemeris does not influence the receiving of data and thus the compressed long-term predicted ephemeris having a small prediction period length can be requested for the server system 3. On the contrary, when the communication status with the server system 3 is poor, it is preferable that the amount of data of the compressed long-term predicted ephemeris is small and thus the compressed long-term predicted ephemeris having a great prediction period length is requested for the server system 3.

Thereafter, the host CPU 420 transmits the request signal for the compressed long-term predicted ephemeris data to the server system 3 along with the prediction period length determined in step D3 (step D5). Then, the host CPU 420 receives the compressed long-term predicted ephemeris data 354 from the server system 3 and updates and stores the received data in the flash ROM 480 (step D7).

The host CPU 420 reconstructs the complete long-term predicted ephemeris data 481 by decompressing the compressed long-term predicted ephemeris (steps D9 to D13). First, the host CPU determines the temporal variation patterns 3431 of the parameters of the GPS satellites with reference to the temporal variation pattern data 3545 included in the compressed long-term predicted ephemeris data 354 received in step D7 (step D9).

The host CPU 420 calculates the parameter values from the compressed parameter values of the parameters of the GPS satellites on the basis of the compression methods 3433 correlated with the temporal variation patterns 3431 determined in step D9 with reference to the compression method data 343 stored in the ROM 470 (step D11).

Then, the host CPU 420 creates the complete long-term predicted ephemeris data 481 including the parameter values calculated in the prediction periods of the GPS satellites SV and updates and stores the created data in the flash ROM 480 (step D13). The host CPU 420 ends the TTFF calculation speedup process.

After performing any one process of steps C3 to C9 in the main process shown in FIG. 29 again, the host CPU 420 determines whether the user performs the power-off instructing operation with the operation unit 430 (step C11). When it is determined that the power-off instructing operation is not performed (NO in step C11), the process of step C1 is repeated. When it is determined that the power-off instructing operation is performed (YES in step C11), the main process is ended.

5. Operational Advantage

In the position calculating system 1, the server system 3 creates the long-term predicted ephemeris which is the ephemeris valid for a long term using the predicted satellite calendars acquired from the external system 2. At this time, the server system 3 determines the compression method of the parameters in the satellite orbit model expression, the parameters in the clock error model expression, and the parameters indicating the satellite orbit reliability on the basis of the temporal variations of the parameter values thereof. The server system 3 reduces the bit sequences representing the parameter values of the parameters using the determined compression methods to calculate the compressed parameter values and provides the compressed parameter values as the compressed long-term predicted ephemeris to the mobile phone 4 along with the identification information of the compression methods of the parameter values.

Since the temporal variation patterns of the plural parameter values and the compression methods suitable for the temporal variation patterns are determined in advance, that enables to properly reduce the bit sequences of the parameters by selecting the compression methods corresponding to the temporal variation patterns suitable for the temporal variations of the parameter values and performing the compression operation, thereby effectively reducing the amount of data of the long-term predicted ephemeris.

The mobile phone 4 acquires the original long-term predicted ephemeris by receiving the compressed long-term predicted ephemeris from the server system 3 and decompressing the compressed parameter values included in the received compressed long-term predicted ephemeris into the original parameter values using the compression methods included in the compressed long-term predicted ephemeris. The mobile phone 4 calculates the position of the mobile phone 4 by performing a predetermined position calculating operation using the acquired long-term predicted ephemeris.

Since the server system 3 provides the compressed long-term predicted ephemeris to the mobile phone 4 along with the identification information of the compression methods, the mobile phone 4 decompressing the compressed long-term predicted ephemeris can see the compression methods used to create the compressed parameter values and can thus reconstruct the parameter values without error.

6. Modified Example

6-1. Position Calculating System

Although the position calculating system 1 including the server system 3 and the mobile phone 4 has been exemplified in the above-mentioned embodiments, the invention is not limited to the position calculating system. For example, the invention may be applied to electronic apparatuses such as a notebook personal computer, a PDA (Personal Digital Assistant), and a car navigation apparatus having a position calculating device, instead of the mobile phone 4.

Although the server system 3 has been exemplified as a type of data compressing apparatus in the above-mentioned embodiments, the data compressing apparatus is not limited to the server system. For example, a general-purpose PC and the like may be employed.

6-2. Satellite Position Calculating System

Although the GPS has been exemplified as the satellite position calculating system in the above-mentioned embodiments, other satellite position calculating systems such as WAAS (Wide Area Augmentation System), QZSS (Quasi Zenith Satellite System), GLONASS (GLObal NAvigation Satellite System), and GALILEO may be employed.

6-3. Division of Processes

A part or all of the processes performed by the host CPU 420 may be performed by the CPU 415. For example, the CPU 415 requests the server system 3 for the compressed long-term predicted ephemeris, decompresses the acquired compressed long-term predicted ephemeris to create the complete long-term predicted ephemeris, and captures and extracts the GPS satellite signals. Instead of the host CPU 420, the CPU 415 may perform the position calculating operation.

6-4. Compression-Method Fixed Parameter

In the above-mentioned embodiments, it has been stated that it is determined what temporal variation patterns the temporal variations of all the parameter values are suitable for and then the compression methods are selected. However, fixed compression methods may be used for fixed temporal variation patterns suitable for the parameters of which the temporal variation tendencies are almost constant regardless of the difference in predicted satellite calendar, the difference in prediction period length, and the difference in GPS satellite.

Specifically, the inventors found out that the temporal variation tendencies of four parameters of the mean anomaly "$M_0$" and the right ascension of an ascending node "$\Omega_0$" which are the satellite orbit parameters and the predicted orbit reliability and the health information which are the reliability parameters are substantially constant. Therefore, these parameters are parameters (hereinafter, referred to as "compression-method fixed parameter") of which the compression methods may be fixed and the compressed parameter values thereof may be calculated using the compression methods specific to the parameters.

Figure 31:
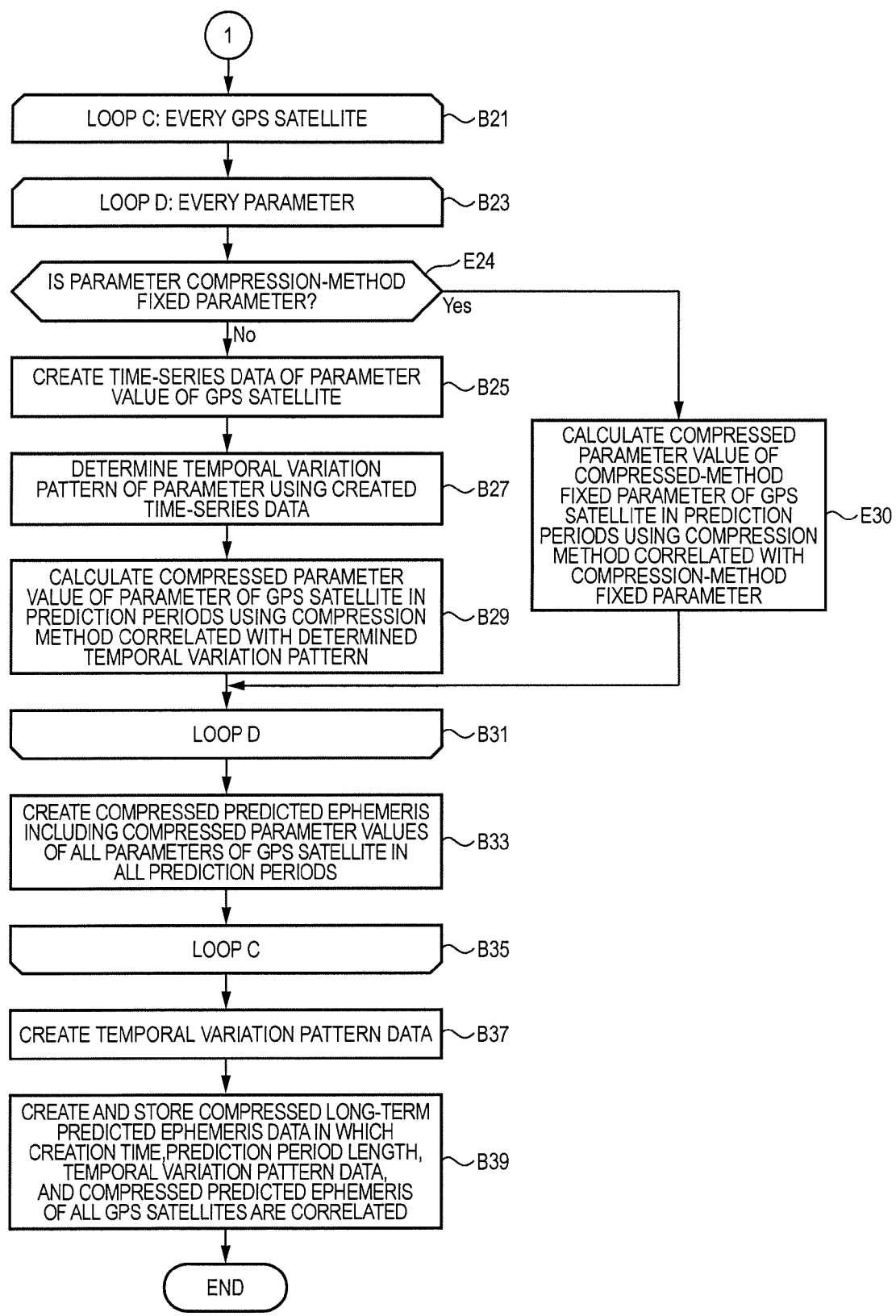
FIG. 31 is a flowchart illustrating the flow of a second compressed long-term predicted ephemeris creating process.

FIG. 31 is a flowchart illustrating a part, which corresponds to the compressed long-term predicted ephemeris creating process shown in FIG. 24, of a second compressed long-term predicted ephemeris creating process performed by the CPU 310 of the server system 3. The same steps as the compressed long-term predicted ephemeris creating process are referenced by the same reference numerals and signs and the description thereof is omitted. Only the part which differs from the compressed long-term predicted ephemeris creating process will be described.

The CPU 310 determines whether the parameter is a compression-method fixed parameter in the processes of loop D (step E24). When it is determined that the parameter is a compression-method fixed parameter (YES in step E24), the CPU calculates the compressed parameter value of the compression-method fixed parameter of the corresponding GPS satellite using the compression method correlated with the compression-method fixed parameter in the prediction periods (step E30). Then, the CPU 310 performs the processes on the next parameter.

When it is determined in step E24 that the parameter is not a compression-method fixed parameter (NO in step E24), the CPU 310 performs the process of step B25.

6-5. Satellite Orbit Approximate Model

Although it has been stated in the above-mentioned embodiments that Kepler's elliptical orbit model is used to calculate the satellite orbit of a GPS satellite, Lagrange, Neville, or Spline approximate models may be used to calculate the satellite orbit. That is, by calculating interpolation polynomial expressions for the GPS satellites using interpolation techniques such as Lagrange, Neville, or Spline methods and using the predicted positions stored in the predicted satellite calendars as sampling points, the satellite orbits of the GPS satellites are approximated to calculate the values of the satellite orbit parameters. Then, the compressed long-term predicted ephemeris is created which is obtained by compressing the values of the satellite orbit parameters.

6-6. Creation Period

Although it has been stated in the above-mentioned embodiments that the long-term predicted ephemeris is created using the period in one week after the creation time of the long-term predicted ephemeris as the creation period, the creation period may be a period (for example, two weeks) longer than one week or may be a period (for example, three days) shorter than one week. The ephemeris transmitted from the GPS satellites SV generally has the available period of about 4 hours, but the long-term predicted ephemeris can have the available period longer than that of the ephemeris transmitted from the GPS satellites SV. For example, it is preferable that the available period is one day or more.

6-7. Determination of Prediction Period Length

Although it has been stated in the above-mentioned embodiments that the mobile phone 4 determines the requested prediction period length of the compressed long-term ephemeris depending on the communication status with the server system 3, the requested prediction period length may be made for the user of the mobile phone 4 to input and the compressed long-term predicted ephemeris with the input prediction period length may be requested for the server system 3.

What is claimed is:

1. A satellite orbit data compression method comprising:
   determining a first compression method of a first set of values for a parameter in a first time period based on a first variation tendency of the first set of values in the first time period;
   compressing the first set of values using the first compression method;
   determining a second compression method of a second set of values for the parameter in a second time period based on a second variation tendency of the second set of values in the second time period, the second time period being longer than the first time period, the second variation tendency being different from the first variation tendency; and
   compressing the second set of values using the second compression method.

2. The satellite orbit data compression method according to claim 1, further comprising
   predetermining a plurality of methods for a plurality of variation tendencies, respectively,
   the determining of the first compression method including selecting first one of the predetermined methods corresponding to the first variation tendency of the first set of values in the first time period, and
   the determining of the second compression method including selecting second one of the predetermined methods corresponding to the second variation tendency of the second set of values in the second time period.

3. The satellite orbit data compression method according to claim 1, further comprising
   employing a predetermined compression method for a certain parameter, the predetermined compression method being suitable for the certain parameter.

4. The satellite orbit data compression method according to claim 1, wherein
   the first and second compression methods are predetermined lossless compression methods, respectively.

5. A satellite orbit data compression method comprising:
   determining a first compression method of a first set of values for a parameter in a first time period based on a first variation tendency of the first set of values in the first time period;
   compressing the first set of values using the first compression method;
   determining a second compression method of a second set of values for the parameter in a second time period based on a second variation tendency of the second set of values in the second time period, the second time period being longer than the first time period, the second variation tendency being different from the first variation tendency;
   compressing the second set of values using the second compression method; and providing long-term predicted ephemeris having one of the first and second sets of values that has been compressed to a position calculating device along with identification information of respective one of the first and second compression method for the parameter.

6. A satellite orbit data compressing device comprising:

a determination unit configured to determine a first compression method of a first set of values for a parameter in a first time period based on a first variation tendency of the first set of values in the first time period, the determination unit being further configured to determine a second compression method of a second set of values for the parameter in a second time period based on a second variation tendency of the second set of values in the second time period, the second time period being longer than the first time period, the second variation tendency being different from the first variation tendency; and a calculation unit configured to compress the first set of values using the first compression method, the calculation unit being further configured to compress the second set of values using the second compression method.

* * * * *